(12) United States Patent  
Mochizuki et al.

(10) Patent No.: US 8,953,164 B2  
(45) Date of Patent: Feb. 10, 2015

(54) WAVELENGTH MONITOR AND WAVELENGTH MONITORING METHOD

(71) Applicant: Mitsubishi Electric Corporation, Chiyoda-ku (JP)

(72) Inventors: Keita Mochizuki, Chiyoda-ku (JP); Yuto Ueno, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/204,260

(22) Filed: Mar. 11, 2014

(65) Prior Publication Data

US 2014/0285807 A1    Sep. 25, 2014

(30) Foreign Application Priority Data

Mar. 25, 2013  (JP) .................................. 2013-062094  
Feb. 3, 2014   (JP) .................................. 2014-018422

(51) Int. Cl.  
*G01J 3/46*    (2006.01)

(52) U.S. Cl.  
CPC ........................................ *G01J 3/462* (2013.01)  
USPC ............................................................ 356/416

(58) Field of Classification Search  
USPC .................................................. 356/416–419  
See application file for complete search history.

(56) References Cited

U.S. PATENT DOCUMENTS

| 6,678,432 B2 * | 1/2004 | Shigeta et al. .................. 385/14 |
| 2002/0071458 A1 | 6/2002 | Iwafuji |
| 2012/0147361 A1 | 6/2012 | Mochizuki et al. |

FOREIGN PATENT DOCUMENTS

| JP | 2002-185074 | 6/2002 |
| JP | 2012-129259 | 7/2012 |

OTHER PUBLICATIONS

Keita Mochizuki, et al., "A Wavelength Monitor using Unequally Spaced Back-emitting Light for Tunable LD Array", Opto-Electronics and Communications Conference (OECC), Jul. 2-6, 2012, 2 pages.

*Primary Examiner* — Tarifur Chowdhury  
*Assistant Examiner* — Abdullahi Nur  
(74) *Attorney, Agent, or Firm* — Oblon, Spivak, McClelland, Maier & Neustadt, L.L.P.

(57) ABSTRACT

The transmittance of a filter periodically varies with respect to the incident light frequency. Provided that $f_k$ is the sum of $F_k$ and $v_k$, or the difference obtained by subtracting $F_k$ from $v_k$, depending on the kth light source among multiple light sources, an incidence guide causes light from the plurality of light sources to be incident on the filter such that the propagation angle of light when light from the kth light source propagates through the interior of the filter equals $\theta_k$ obtained by computation using $f_k$. The incidence guide causes light to be incident on the filter, taking $f_k$ to be the sum of $v_k$ and $F_k$ for at least one of the light sources, and taking $f_k$ to be the difference between $v_k$ and $F_k$ for at least one other of the light sources. A detector detects the intensity of transmitted light that transmits through the filter.

20 Claims, 26 Drawing Sheets

FIG.2

| LIGHT SOURCE ID NUMBER | L1 | L2 | L3 | L4 | L5 | L6 | L7 | L8 | L9 | L10 | L11 | L12 |
|---|---|---|---|---|---|---|---|---|---|---|---|---|
| Y COORDINATE VALUE OF EMISSION POINT($\mu$m) | -38.6 | -36.3 | -29.6 | -26.6 | -16.2 | -9.5 | 9.5 | 16.2 | 26.6 | 29.6 | 36.3 | 38.6 |
| PROPAGATION ANGLE $\theta$ (DEG.) | -3.16 | -2.97 | -2.42 | -2.17 | -1.33 | -0.78 | 0.78 | 1.33 | 2.17 | 2.41 | 2.97 | 3.16 |
| SIGN FOR DEFINING $f_k$ | POS. (+) | NEG. (-) | POS. (+) | NEG. (-) | POS. (+) | NEG. (-) | NEG. (-) | POS. (+) | NEG. (-) | POS. (+) | NEG. (-) | POS. (+) |

FIG.5

| LIGHT SOURCE ID NUMBER | L1 | L2 | L3 | L4 | L5 | L6 | L7 | L8 | L9 | L10 | L11 | L12 |
|---|---|---|---|---|---|---|---|---|---|---|---|---|
| Y COORDINATE VALUE OF EMISSION POINT($\mu$m) | -56.3 | -50.5 | -44.0 | -36.3 | -26.6 | -9.5 | 9.5 | 26.6 | 36.3 | 44.0 | 50.5 | 56.3 |
| PROPAGATION ANGLE $\theta$ (DEG.) | -4.60 | -4.13 | -3.60 | -2.97 | -2.17 | -0.78 | 0.78 | 2.17 | 2.97 | 3.60 | 4.13 | 4.60 |
| SIGN FOR DEFINING $f_k$ | NEG. (−) | NEG. (−) | NEG. (−) | NEG. (−) | NEG. (−) | NEG. (−) | NEG. (−) | NEG. (−) | NEG. (−) | NEG. (−) | NEG. (−) | NEG. (−) |

FIG.6

| LIGHT SOURCE ID NUMBER | L1 | L2 | L3 | L4 | L5 | L6 | L7 | L8 | L9 | L10 | L11 | L12 |
|---|---|---|---|---|---|---|---|---|---|---|---|---|
| Y COORDINATE VALUE OF EMISSION POINT ($\mu m$) | -57.8 | -52.2 | -45.9 | -38.6 | -29.6 | -16.2 | 16.2 | 29.6 | 38.6 | 45.9 | 52.2 | 57.8 |
| PROPAGATION ANGLE $\theta$ (DEG.) | -4.72 | -4.27 | -3.75 | -3.16 | -2.42 | -1.33 | 1.33 | 2.41 | 3.16 | 3.75 | 4.27 | 4.72 |
| SIGN FOR DEFINING $f_k$ | POS. (+) | POS. (+) | POS. (+) | POS. (+) | POS. (+) | POS. (+) | POS. (+) | POS. (+) | POS. (+) | POS. (+) | POS. (+) | POS. (+) |

FIG.11

| LIGHT SOURCE ID NUMBER | L1 | L2 | L3 | L4 | L5 | L6 | L7 | L8 | L9 | L10 | L11 | L12 |
|---|---|---|---|---|---|---|---|---|---|---|---|---|
| Y COORDINATE VALUE OF EMISSION POINT($\mu$m) | -44.0 | -36.3 | -29.6 | -26.6 | -16.2 | -9.5 | 9.5 | 16.2 | 26.6 | 29.6 | 36.3 | 44.0 |
| PROPAGATION ANGLE $\theta$ (DEG.) | -3.60 | -2.97 | -2.42 | -2.17 | -1.33 | -0.78 | 0.78 | 1.33 | 2.17 | 2.42 | 2.97 | 3.60 |
| SIGN FOR DEFINING $f_k$ | NEG. (−) | NEG. (−) | POS. (+) | NEG. (−) | POS. (+) | NEG. (−) | NEG. (−) | POS. (+) | NEG. (−) | POS. (+) | NEG. (−) | NEG. (−) |

FIG.13

| LIGHT SOURCE ID NUMBER | L1 | L2 | L3 | L4 | L5 | L6 | L7 | L8 | L9 | L10 | L11 | L12 |
|---|---|---|---|---|---|---|---|---|---|---|---|---|
| Y COORDINATE VALUE OF EMISSION POINT (μm) | -43.8 | -36.2 | -30.0 | -26.3 | -16.6 | -9.6 | 9.6 | 16.6 | 26.3 | 30.0 | 36.2 | 43.8 |
| PROPAGATION ANGLE θ (DEG.) | -3.58 | -2.96 | -2.46 | -2.15 | -1.35 | -0.78 | 0.78 | 1.35 | 2.15 | 2.46 | 2.96 | 3.58 |
| SIGN FOR DEFINING $f_k$ | NEG. (−) | NEG. (−) | POS. (+) | NEG. (−) | POS. (+) | NEG. (−) | NEG. (−) | POS. (+) | NEG. (−) | POS. (+) | NEG. (−) | NEG. (−) |

FIG.20

| LIGHT SOURCE ID NUMBER | L1 | L2 | L3 | L4 | L5 | L6 | L7 | L8 | L9 | L10 | L11 | L12 |
|---|---|---|---|---|---|---|---|---|---|---|---|---|
| FILTER TEMPERATURE (°C) | 25.0 | 68.2 | 25.0 | 68.2 | 25.0 | 68.2 | 68.2 | 25.0 | 68.2 | 25.0 | 68.2 | 25.0 |
| LOWER-FREQUENCY SIDE WAVELENGTH CAPTURE RANGE (GHz) | 34.9 | 35.3 | 34.8 | 34.8 | 35.1 | 35.3 | 35.3 | 35.1 | 34.8 | 34.8 | 35.3 | 34.9 |
| HIGHER-FREQUENCY SIDE WAVELENGTH CAPTURE RANGE (GHz) | 15.0 | 14.7 | 15.2 | 15.2 | 14.8 | 14.7 | 14.7 | 14.8 | 15.2 | 15.2 | 14.7 | 15.0 |

FIG.25

| LIGHT SOURCE ID NUMBER | L1 | L2 | L3 | L4 | L5 | L6 | L7 | L8 | L9 | L10 | L11 | L12 |
|---|---|---|---|---|---|---|---|---|---|---|---|---|
| FILTER TEMPERATURE (°C) | 25.0 | 25.0 | 25.0 | 25.0 | 25.0 | 25.0 | 25.0 | 25.0 | 25.0 | 25.0 | 25.0 | 25.0 |
| LOWER-FREQUENCY SIDE WAVELENGTH CAPTURE RANGE (GHz) | 34.9 | 14.7 | 34.8 | 15.2 | 35.1 | 14.7 | 14.7 | 35.1 | 15.2 | 34.8 | 14.7 | 34.9 |
| HIGHER-FREQUENCY SIDE WAVELENGTH CAPTURE RANGE (GHz) | 15.0 | 35.3 | 15.2 | 34.8 | 14.8 | 35.3 | 35.3 | 14.8 | 34.8 | 15.2 | 35.3 | 15.0 |

WAVELENGTH MONITOR AND WAVELENGTH MONITORING METHOD

CROSS-REFERENCE TO RELATED APPLICATION

This application claims the benefit of Japanese Patent Application No. 2013-062094, filed on Mar. 25, 2013 and Japanese Patent Application No. 2014-018422 filed Feb. 3, 2014, the entire disclosure of which are incorporated by reference herein.

FIELD

The present invention relates to a wavelength monitor and a wavelength monitoring method.

BACKGROUND

Recently, in the field of optical communication, optical transmission schemes for realizing faster, higher capacity communication are being implemented. In addition, wavelength-division multiplexing (WDM) schemes, in which multiple optical signals at different wavelengths are multiplexed and transmitted over a single optical fiber, are becoming prevalent as a central technology for such optical transmission schemes.

Operating a stable communication system using a WDM scheme requires reserving a backup light source in case of an unexpected stop in the optical signal light source. However, in the case in which a backup light source is reserved for each wavelength of the multiplexed optical signals, the number of backup light sources increases, and there is an increase in the cost of maintaining these light sources. Accordingly, in order to moderate this cost, demand is growing for an optical module capable of modifying the wavelength of emitted light.

A representative example of such an optical module implements a technique of modifying the oscillation wavelength by varying the temperature of a semiconductor laser. In an optical module adopting this technique, the fluctuation range of the oscillation wavelength becomes at most approximately 2 nm to 3 nm, depending on the operating temperature range of the optical module. For this reason, the range of optical wavelengths that an optical module is capable of emitting is often widened by providing multiple semiconductor lasers in the optical module.

In addition, in optical modules used for optical communication, it is demanded that the wavelength of emitted light be stable over long periods. Stabilizing the wavelength requires monitoring the wavelength of emitted light, and controlling factors such as the temperature of the semiconductor laser. Accordingly, an optical module that includes the functions of a wavelength monitor has been developed (for example, see Patent Literature 1 (Unexamined Japanese Patent Application Kokai Publication No. 2002-185074) and Patent Literature 2 (Unexamined Japanese Patent Application Kokai Publication No. 2012-129259)).

The device described in Patent Literature 1 (Unexamined Japanese Patent Application Kokai Publication No. 2002-185074) uses an optical multiplexer to multiplex light emitted in the forward direction from multiple semiconductor lasers, and output the multiplexed light to optical fiber. Additionally, this device draws off part of the output light with a beam splitter or the like to monitor the wavelength.

Also, the wavelength monitor described in Patent Literature 2 (Unexamined Japanese Patent Application Kokai Publication No. 2012-129259) monitors the wavelength by causing light emitted in the backward direction from multiple semiconductor lasers disposed in an array to be collimated by a lens and incident on an etalon.

However, since the light emitted in the forward direction from the semiconductor lasers is output to optical fiber or the like and used for optical communication, with the device described in Patent Literature 1 (Unexamined Japanese Patent Application Kokai Publication No. 2002-185074), there is a risk of reduced power of the optical signal used for optical communication. Also, since the device described in Patent Literature 1 (Unexamined Japanese Patent Application Kokai Publication No. 2002-185074) is equipped with optical elements such as a beam splitter, in which there is a risk of an enlarged overall device size, and increased manufacturing costs.

On the other hand, since the wavelength monitor described in Patent Literature 2 (Unexamined Japanese Patent Application Kokai Publication No. 2012-129259) uses light emitted in the backward direction, there is no risk of reduced power in the optical signal. Also, since this wavelength monitor is not equipped with a beam splitter or the like, there is also no risk of enlarged size or increased manufacturing costs.

However, with the wavelength monitor described in Patent Literature 2 (Unexamined Japanese Patent Application Kokai Publication No. 2012-129259), from among the semiconductor lasers disposed in an array, a semiconductor laser positioned at the end emits light from a point that is greatly distanced from the center axis of the lens. For this reason, light emitted from a semiconductor laser positioned at the end enters the etalon at a large angle of incidence, and propagates in the etalon interior at a large propagation angle.

An etalon functions as a filter with periodic transmitting characteristics with respect to the frequency of light, due to the interference of multiply reflected light in the interior. For this reason, the transmittance of light that propagates at a large propagation angle is weakly frequency-dependent, and there is a risk of reduced sensitivity in the wavelength monitor.

SUMMARY

The present invention, being devised in light of the above circumstances, has as an object to improve the sensitivity of a wavelength monitor.

In order to achieve the above object, a wavelength monitor of the present invention is equipped with: a filter whose transmittance periodically varies with respect to incident light frequency; an incidence guide that, provided that $v_k$ is a frequency acting as a reference for monitoring wavelength of light from a kth light source from among a plurality of sequentially arranged light sources, provided that $F_k$ is a positive value according to the kth light source, provided that $f_k$ is a sum obtained by adding $F_k$ to $v_k$ or a difference obtained by subtracting $F_k$ from $v_k$, provided that $m_k$ is the order of interference according to the kth light source, provided that c is the speed of light, provided that n is the refractive index of the filter, and provided that L is the length of the filter, causes light from the plurality of light sources to be incident on the filter such that, when light from the kth light source propagates through the interior of the filter, a propagation angle of that light equals $\theta_k$ obtained by computation using $m_k$, c, n, L, and $f_k$; and a detector that senses transmitted light transmitted through the filter, and detects the intensity of transmitted light; wherein the incidence guide causes light to be incident on the filter, taking $f_k$ to be the sum of $v_k$ and $F_k$ for at least one of the light sources, and taking $f_k$ to be the difference between $v_k$ and $F_k$ for at least one other of the light sources.

BRIEF DESCRIPTION OF THE DRAWINGS

A more complete understanding of this application can be obtained when the following detailed description is considered in conjunction with the following drawings, in which:

FIG. 2 is a diagram illustrating, for respective light sources, the Y coordinate value of an emission point, the propagation angle θ, and the sign for defining $f_k$;

FIG. 5 is a diagram illustrating, for respective light sources, the Y coordinate value of an emission point, the propagation angle θ, and the sign for defining fk, according to a comparative example;

FIG. 6 is a diagram illustrating, for respective light sources, the Y coordinate value of an emission point, the propagation angle θ, and the sign for defining fk, according to a comparative example;

FIG. 11 is a diagram illustrating, for respective light sources, the Y coordinate value of an emission point, the propagation angle θ, and the sign for defining $f_k$, according to Embodiment 3;

FIG. 13 is a diagram illustrating, for respective light sources, the Y coordinate value of an emission point, the propagation angle θ, and the sign for defining $f_k$, according to Embodiment 4;

FIG. 20 is a diagram illustrating filter temperatures and wavelength capture ranges for respective light sources;

FIG. 25 is a diagram illustrating filter temperatures and wavelength capture ranges according to a comparative example.

DETAILED DESCRIPTION

Hereinafter, exemplary embodiments for carrying out the present invention will be described in detail and with reference to the drawings. For the purpose of description, a coordinate system made up of mutually orthogonal X and Y axes will be used.

Embodiment 1

Figure 1:
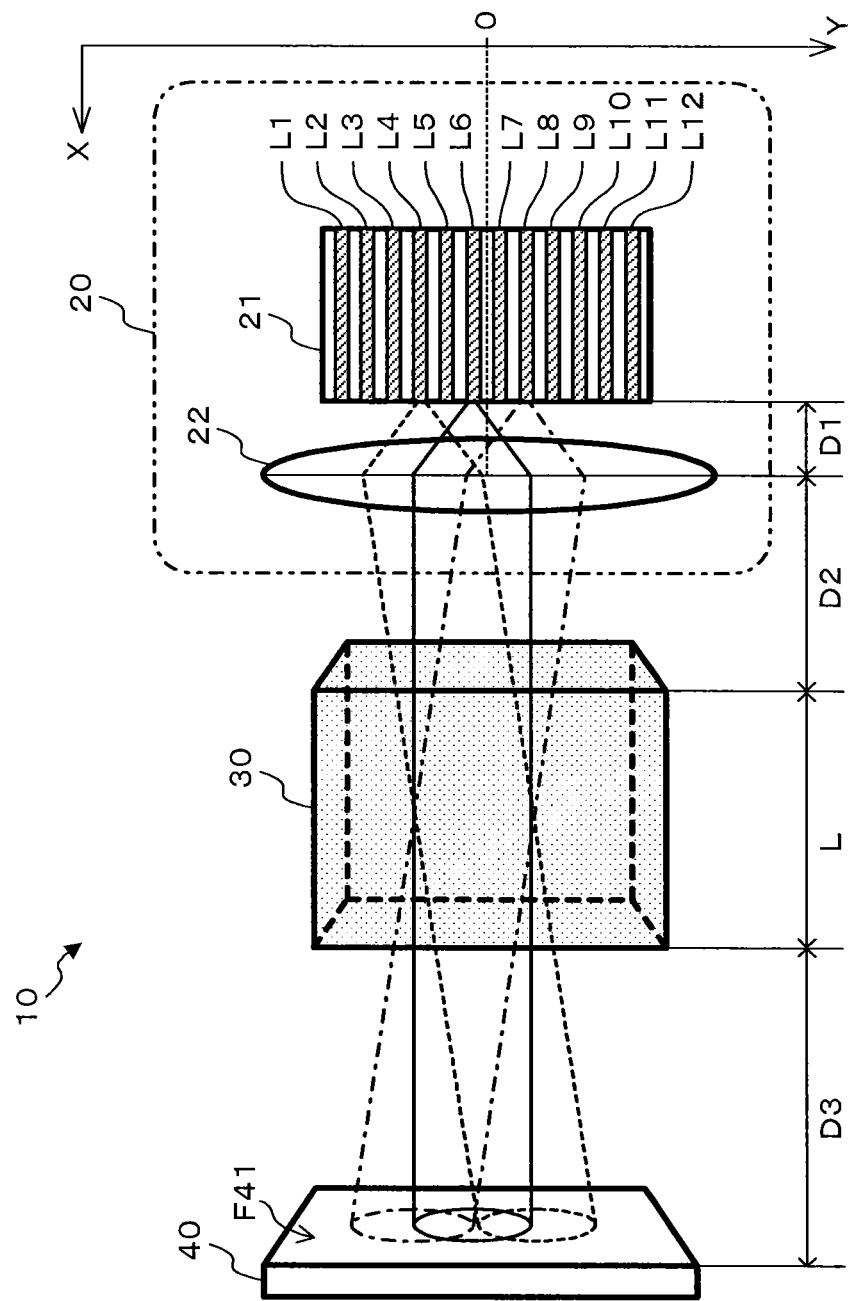
FIG. 1 is a diagram illustrating a configuration of a wavelength monitor according to Embodiment 1.

A wavelength monitor 10 according to the present embodiment constitutes part of an optical module capable of emitting laser light at an arbitrary wavelength. Additionally, the wavelength monitor 10 monitors the wavelength of laser light emitted from the optical module. Hereinafter, laser light will be simply designated "light". As illustrated in FIG. 1, the wavelength monitor 10 includes an incidence guide 20, a filter 30, and a detector 40.

The incidence guide 20 causes light to be incident on the filter 30, so that the propagation angle of light propagating in the interior of the filter 30 becomes an angle obtained by an arithmetic expression to be discussed later. The incidence guide 20 includes a semiconductor substrate 21 and a lens 22.

On the semiconductor substrate 21, there are formed 12 light sources L1 to L12 disposed in parallel, and in a direction parallel to the Y axis. Each of the light sources L1 to L12 is a semiconductor laser that emits light at a wavelength depending on temperature, for example.

In addition, each of the light sources L1 to L12 emits light in two directions: the +X direction, and the −X direction. Light emitted in the −X direction is used for optical communication or the like. On the other hand, light emitted in the +X direction is used for wavelength monitoring. FIG. 1 schematically illustrates the optical paths of light emitted in the +X direction from each of the light sources L4, L6, and L8 using broken lines, solid lines, and chain lines, respectively. Note that the −X direction is designated the "forward direction" or "forward", while the +X direction is designated the "backward direction" or "backward".

FIG. 2 illustrates the Y coordinate value of the emission point of light emitted in the +X direction from each of the light sources L1 to L12. As illustrated in FIG. 2, the emission points of the light sources L1 to L12 are arranged with unequal spacing, with the magnitude of the Y coordinate value being 40 μm or less in all cases. In addition, the emission points of the light sources L1 to L6 and the emission points of the light sources L7 to 12 are symmetrically disposed, taking the origin of the Y coordinates as a reference. Note that in FIG. 2, a number similar to the reference sign of each of the light sources L1 to L12 is used as an identification number for each of the light sources L1 to L12. For example, the identification number for the light source L1 is "L1".

The lens 22 is a collimating lens with a focal length of 0.7 mm, for example. The lens 22 is disposed at a position such that the distance D1 on the X axis between the center of the lens 22 and the emission points of the light sources L1 to L12 is 0.7 mm. Also, the center axis (optical axis) of the lens 22 passes through the original of the Y coordinates, becoming an axis parallel to the X axis. Additionally, the lens 22 collimates diffuse light emitted from each of the light sources L1 to L12 to form collimated light (parallel light).

The filter 30 is an optical element with periodic transmitting characteristics with respect to the frequency of incident light, and is an etalon, for example. The refractive index of the filter 30 is 1.52, for example. Also, the free spectral range (FSR) of the filter 30 is 50 GHz, for example. The filter 30 is disposed at a position such that the distance D2 on the X axis to the center of the lens 22 is 3.0 mm.

Figure 3:
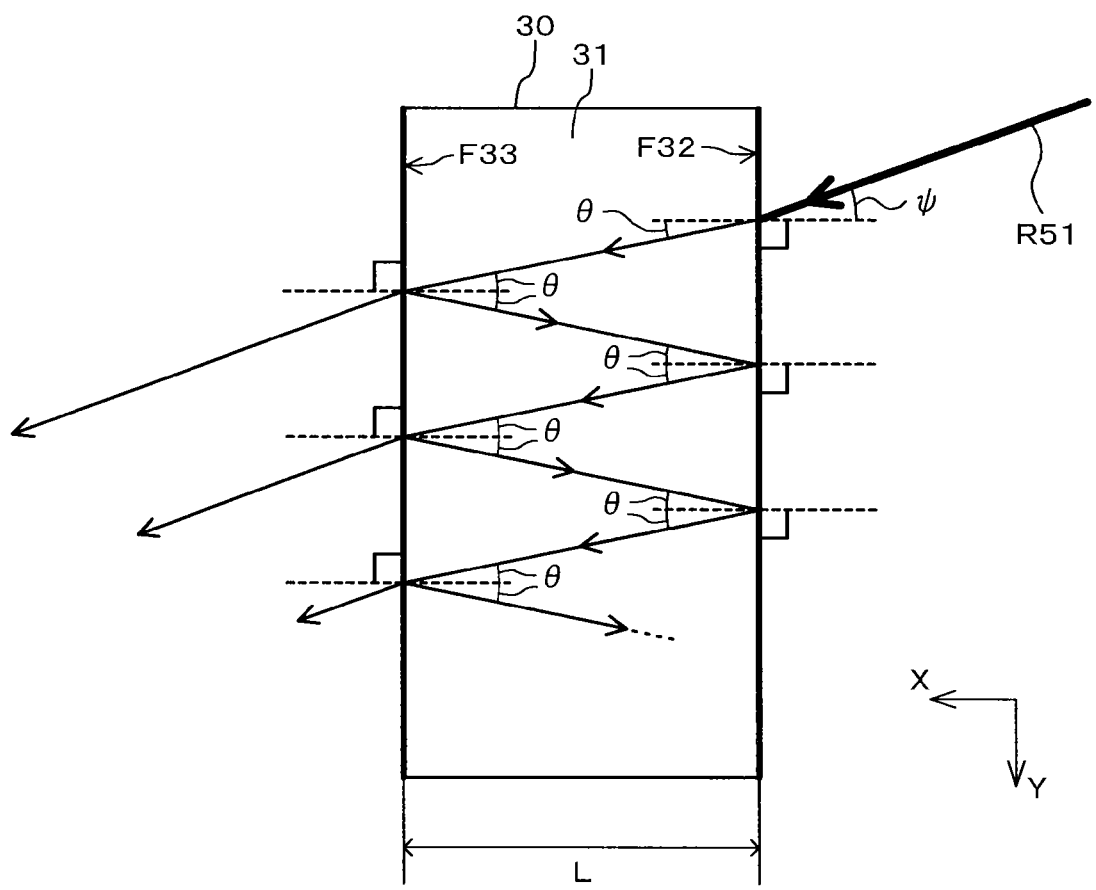
FIG. 3 is a diagram illustrating a light ray reflecting inside a filter.

As illustrated in FIG. 3, the filter 30 includes a gap 31, a first reflecting face F32, and a second reflecting face F33. The gap 31 is a planar member made of crystal, for example. Also, each of the first reflecting face F32 and the second reflecting face F33 are dielectric multilayers that are vapor-deposited onto the −X face and the +X face of the gap 31, respectively. The first reflecting face F32 and the second reflecting face F33 oppose each other in parallel.

Note that the filter 30 is disposed such that the first reflecting face F32 and the second reflecting face F33 are orthogonal to an axis parallel to the X axis. In addition, the "refractive index of the filter 30" means the refractive index of the gap 31 between the first reflecting face F32 and the second reflecting face F33. Also, the "length L of the filter 30" means the distance between the first reflecting face F32 and the second reflecting face F33.

FIG. 3 illustrates a state in which a light ray R51 constituting part of the collimated light propagates through the air and is incident on the filter 30. When the light ray R51 is incident on the filter 30 at an angle of incidence ψ, part of the light ray R51 propagates through the interior of the filter 30 while being refracted at a refractive angle θ, according to Snell's law. Light propagating in the interior of the filter 30 is repeatedly reflected and transmitted at the first reflecting face F32 and the second reflecting face F33.

The angles of incidence and the angle of reflection of light rays at the first reflecting face F32 and the second reflecting face F33 are all an angle θ equal to the refractive angle θ. Hereinafter, the refractive angle θ as well as the angle of incidence and the angle of reflection (the angle θ) will be collectively designated the propagation angle θ. Also, the value of the propagation angle θ is defined with reference to the +X direction. For example, the propagation angle θ illustrated in FIG. 3 becomes a negative angle with reference to the +X direction.

FIG. 2 illustrates the propagation angle θ of light when light from each of the light sources L1 to L12 propagates through the interior of the filter 30. As illustrated in FIG. 2, the propagation angles θ of light from the light sources L1 to L6 are all negative values, whereas the propagation angles θ of light from the light sources L7 to L12 are all positive values. Also, the magnitude of the propagation angle θ of light from each of the light sources L1 to L6 is equal to the magnitude of the propagation angle θ of light from each of the light sources L12 to L7, respectively. Also, the magnitudes of the propagation angle θ of light from the light sources L1 to L12 are all equal to or greater than 0.7 degrees.

The propagation angle θ of light from the kth light source from among the light sources L1 to L12 is equal to the angle $θ_k$ expressed in Eq. (1) below. Note that the "kth light source" means the kth light source from among the light sources L1 to L12, counting from the light source L1. For example, the 1st light source is the light source L1, the 2nd light source is the light source L2, and the 12th light source is the light source L12.

$$θ_k = \arccos\left(\frac{m_k c}{2nLf_k}\right) \quad (1)$$

Herein, $m_k$ is the order of interference according to the kth light source, and is an arbitrary natural number for each value of k (1, 2, ..., 12). Also, c represents the speed of light, n represents the refractive index of the filter 30, and L represents the length of the filter 30. Also, $f_k$ is expressed by Eq. (2) below.

$$f_k = ν_k ± F_k \quad (2)$$

Herein, $ν_k$ is a frequency that acts as a reference for monitoring the wavelength of light from the kth light source (wavelength lock frequency). The term $ν_k$ corresponds to a wavelength grid with a 50 GHz interval as specified by the International Telecommunication Union-Telecommunication Standardization Sector, or ITU-T (hereinafter, the ITU-T grid), for example.

Also, $F_k$ is a positive value according to the kth light source, and is a smaller value than the half-cycle of the transmitting characteristics of the filter 30. The value of $F_k$ is determined on the basis of the slope (gradient) of the transmitting characteristics of the filter 30 or the like. The term $F_k$ according to the present embodiment is uniformly 7.5 GHz, irrespective of the value of k.

As illustrated in Eq. (2), $f_k$ is the sum or difference of $ν_k$ and $F_k$, defined according to the value of k. Specifically, $f_k$ is defined as the sum of $ν_k$ and $F_k$ when the value of Eq. (3) below is an even number, and is defined as the difference between $ν_k$ and $F_k$ when the value of Eq. (3) is an odd number. Note that Eq. (3) indicates the value of a ceiling function with respect to the magnitude (absolute value) of k−(K/2+0.5). The outermost parentheses in Eq. (3) represent a ceiling function that indicates the smallest integer equal to or greater than the real number inside the parentheses.

$$\left\lceil \left| k - \left(\frac{K}{2} + 0.5\right) \right| \right\rceil \quad (3)$$

Herein, K is the number of light sources. The value of K according to the present embodiment is 12. By determining $f_k$ on the basis of the above Eq. (3), the formula defining $f_k$ becomes $f_k = ν_k + F_k$ in the case in which the value of k is an even number less than or equal to 6, or in the case in which the value of k is an odd number equal to or greater than 7. Also, the formula defining $f_k$ becomes $f_k = ν_k − F_k$ in the case in which the value of k is an odd number less than or equal to 6, or in the case in which the value of k is an even number equal to or greater than 7.

FIG. 2 illustrates the positive or negative sign for defining $f_k$ in correspondence with the kth light source. For example, $f_1$, which corresponds to the 1st light source L1, is defined as $f_1 = ν_1 + F_1$, while $f_2$, which corresponds to the 2nd light source L2, is defined as $f_2 = ν_2 − F_2$.

Note that the above Eq. (1) is equivalent to a formula that expresses a condition for the transmitting characteristics of the filter 30 to reach a peak. For this reason, $f_k$ is a frequency corresponding to a peak in the transmitting characteristics. Also, the above Eq. (2) indicates that a peak frequency of the transmitting characteristics ($f_k$) is $F_k$ away from the frequency that acts as a monitoring reference ($v_k$).

In addition, as FIG. 2 demonstrates, as the propagation angle θ increases, the Y coordinate value of the emission point also increases, with the propagation angle θ having a one-to-one correspondence with the Y coordinate value. More accurately, the Y coordinate value of the emission point is proportional to the sine value of the propagation angle θ (sin θ). In other words, the emission points of each of the light sources L1 to L12 are disposed such that the propagation angle θ of light from each of the light sources L1 to L12 equals the angle $θ_k$ indicated by the above Eq. (1).

Returning to FIG. 3, the light rays transmitted through the second reflecting face F33 interfere with each other to become transmitted light with an intensity according to frequency.

Returning to FIG. 1, the detector 40 is made up of a photodiode or the like, for example. The detector 40 includes a light-sensing face F41 that senses transmitted light transmitted through the filter 30. The detector 40 detects the intensity of transmitted light sensed at the light-sensing face F41, and outputs an electrical signal according to the detected intensity externally to the wavelength monitor 10.

The shape of the light-sensing face F41 is square with an edge length of 250 μm, for example. The light-sensing face F41 is disposed orthogonally to the X axis, at a position a distance D3 away from the filter 30. The distance D3 is 1.0 mm, for example.

Figure 4:
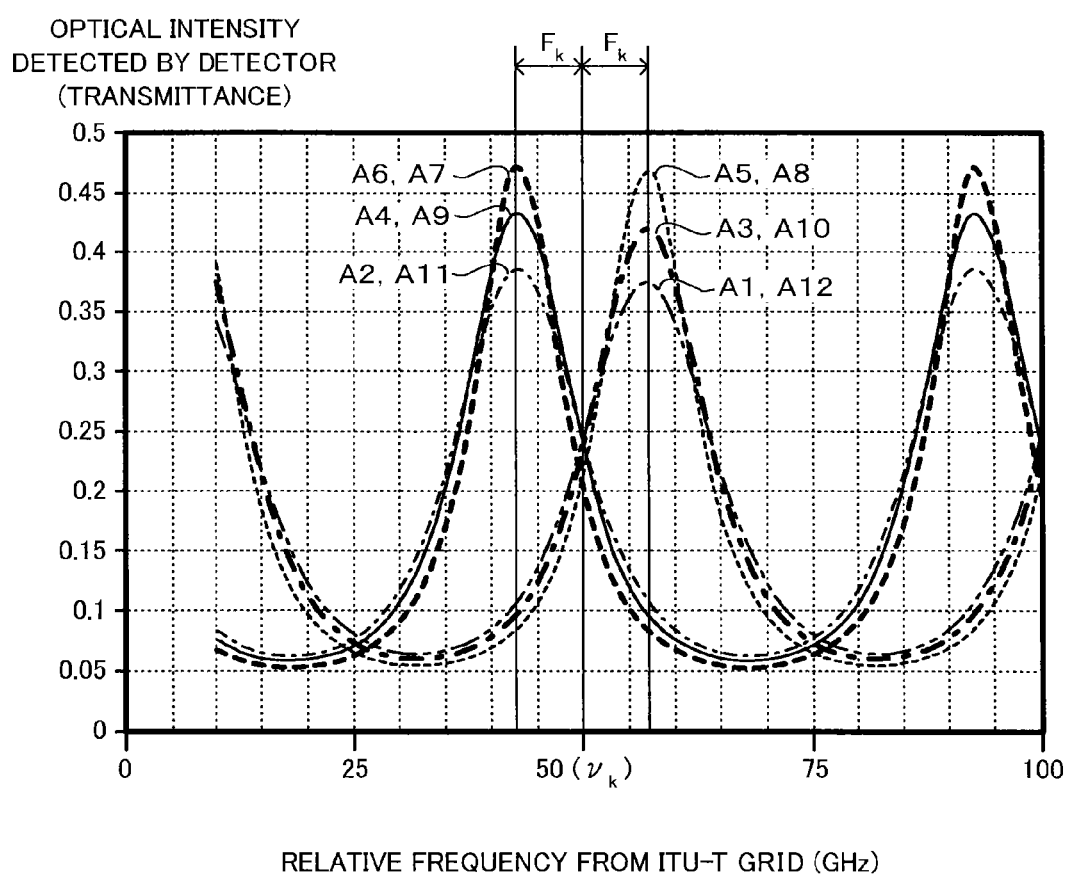
FIG. 4 is a diagram illustrating the relationship between the intensity of transmitted light detected by a detector, and the frequency of the transmitted light.

FIG. 4 illustrates the relationship between the intensity of transmitted light detected by the detector 40, and the frequency of the transmitted light. Note that since the intensity of transmitted light is proportional to the transmittance of the filter 30, the relationship between intensity and frequency illustrated in FIG. 4 is substantially equal to the transmitting characteristics of the detector 40 (the frequency characteristics of the transmittance).

Also, since the light sources L1 to L12 emit light at different wavelengths, if the horizontal axis is a simple frequency axis, the intensity of transmitted light detected for each light source will be displayed apart in the horizontal axis direction. However, in FIG. 4, by shifting the horizontal axis for each light source by an integer multiple of 50 GHz, the relationship between the intensity and frequency of transmitted light is displayed such that $v_k$ is positioned at 50 GHz while maintaining the relative positions between the intensity of transmitted light and the ITU-T grid.

Each of the curves A1 to A12 in FIG. 4 indicates the relationship between the intensity and frequency of transmitted light detected for each of the light sources L1 to L12, and indicates the transmitting characteristics of the filter 30 for light from each of the light sources L1 to L12. Since $f_k$ is defined as the sum or difference of $v_k$ and $F_k$, FIG. 4 demonstrates that a frequency ($f_k$) corresponding to peaks in the curves A1 to A12 is positioned $F_k$ away from $v_k$ (50 GHz) on the left and right sides. FIG. 4 also demonstrates that the peak in the transmitting characteristics becomes smaller, since the magnitude of the propagation angle θ also increases as the magnitude of the Y coordinate value of the emission point increases. For example, the peaks of the curves A1 and A12 are smaller than the peaks of the curves A6 and A7.

As illustrated in FIG. 4, $v_k$ corresponds not to the peak or the bottom of the transmitting characteristics, but to the slope of the transmitting characteristics, and frequencies near $v_k$ correspond one-to-one with the intensity of transmitted light. For this reason, if the relationship between the intensity and frequency of transmitted light illustrated in FIG. 4 is clarified in advance, monitoring the wavelength of light from the light sources L1 to L12 on the basis of an electrical signal output from the detector 40 becomes possible.

Also, as illustrated in FIG. 4, $F_k$ corresponds to the difference between the frequency ($v_k$) when the transmittance of the filter 30 is smaller than the transmittance corresponding to the peaks of the transmitting characteristics and greater than the transmittance corresponding to the bottoms of the transmitting characteristics, and the frequency closest to $v_k$ from among the frequencies corresponding to the peaks of the transmitting characteristics. The value of $F_k$ is determined such that the frequency at which the magnitude of the slope of the transmitting characteristics is as large as possible corresponds to $v_k$, for example.

As described above, the wavelength monitor 10 according to the present embodiment takes $f_k$ to be the sum of $v_k$ and $F_k$ for at least one light source, takes $f_k$ to be the difference between $v_k$ and $F_k$ for at least one other light source, and causes light to be incident on the filter 30. At this point, two comparative examples will be described in order to explain the advantageous effects of the wavelength monitor 10 according to the present embodiment.

Although the wavelength monitors according to the two comparative examples both include a similar configuration to the wavelength monitor 10 according to the present embodiment, as respectively illustrated in FIGS. 5 and 6, the Y coordinate values of the emission points of the light sources L1 to L12 differ from those according to the present embodiment (see FIG. 2).

Specifically, in the example illustrated in FIG. 5, the positive or negative signs for defining $f_k$ are all negative signs. In other words, $f_k$ is defined as the difference between $v_k$ and $F_k$ ($f_k=v_k-F_k$), irrespective of the value of k. Also, in the example illustrated in FIG. 6, the positive or negative signs for defining $f_k$ are all positive signs. In other words, $f_k$ is defined as the sum of $v_k$ and $F_k$ ($f_k=v_k+F_k$), irrespective of the value of k.

In these comparative examples, the distribution of values for the angle $θ_k$ indicated in the above Eq. (1) is more spread out compared to the present embodiment. Consequently, light from the light sources L1 to L12 is incident on the filter 30 such that a comparatively larger magnitude of angle $θ_k$ and propagation angle θ become equal. For this reason, the magnitude of the Y coordinate values of the emission points of the light sources L1 and L12 exceed 55 μm.

Figure 7:
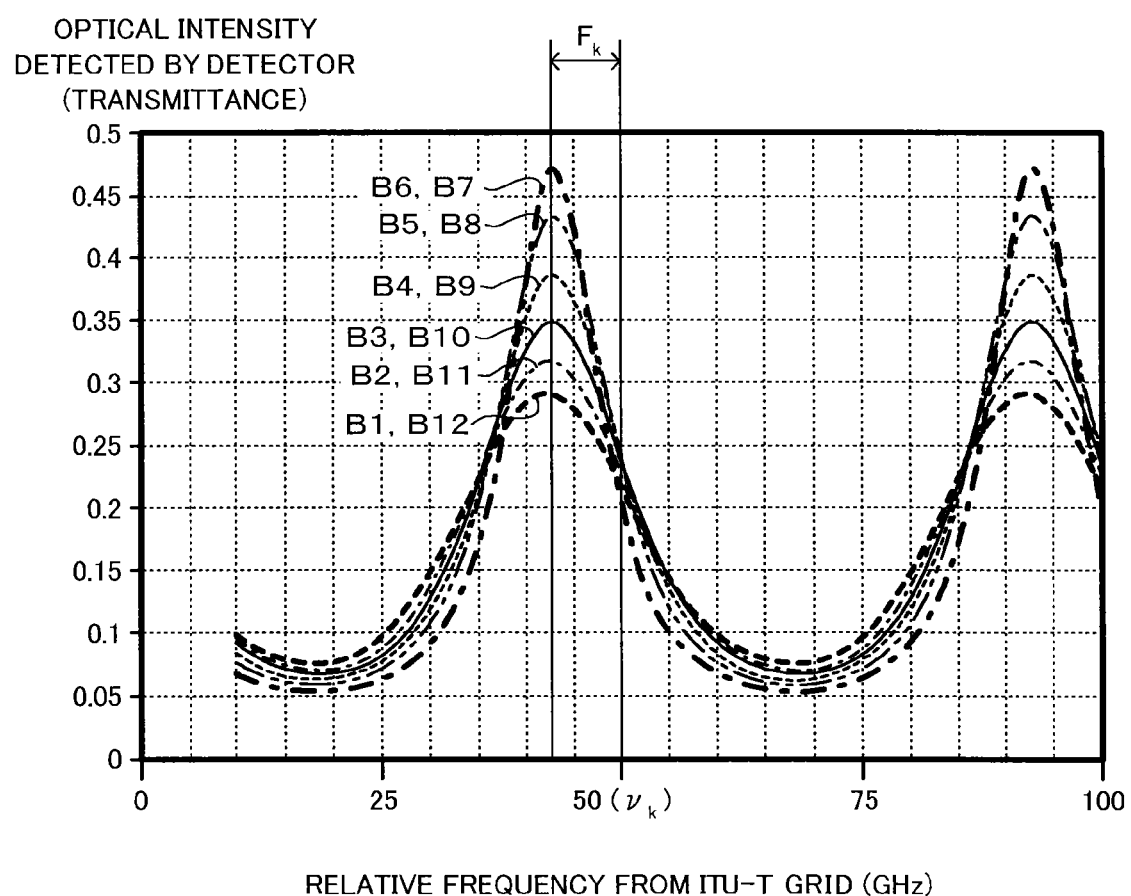
FIG. 7 is a diagram illustrating the relationship between the intensity of transmitted light detected by a detector, and the frequency of the transmitted light, according to a comparative example.

Each of the curves B1 to B12 in FIG. 7 indicates the relationship between the intensity and frequency of transmitted light detected for each of the light sources L1 to L12 from the example illustrated in FIG. 5, and indicates the transmitting characteristics of the filter 30 for light from each of the light sources L1 to L12. Since $f_k$ is defined as the difference between $v_k$ and $F_k$ irrespective of the value of k, the frequencies corresponding to the peaks in the curves B1 to B12 ($f_k$) are all less than $v_k$.

Figure 8:
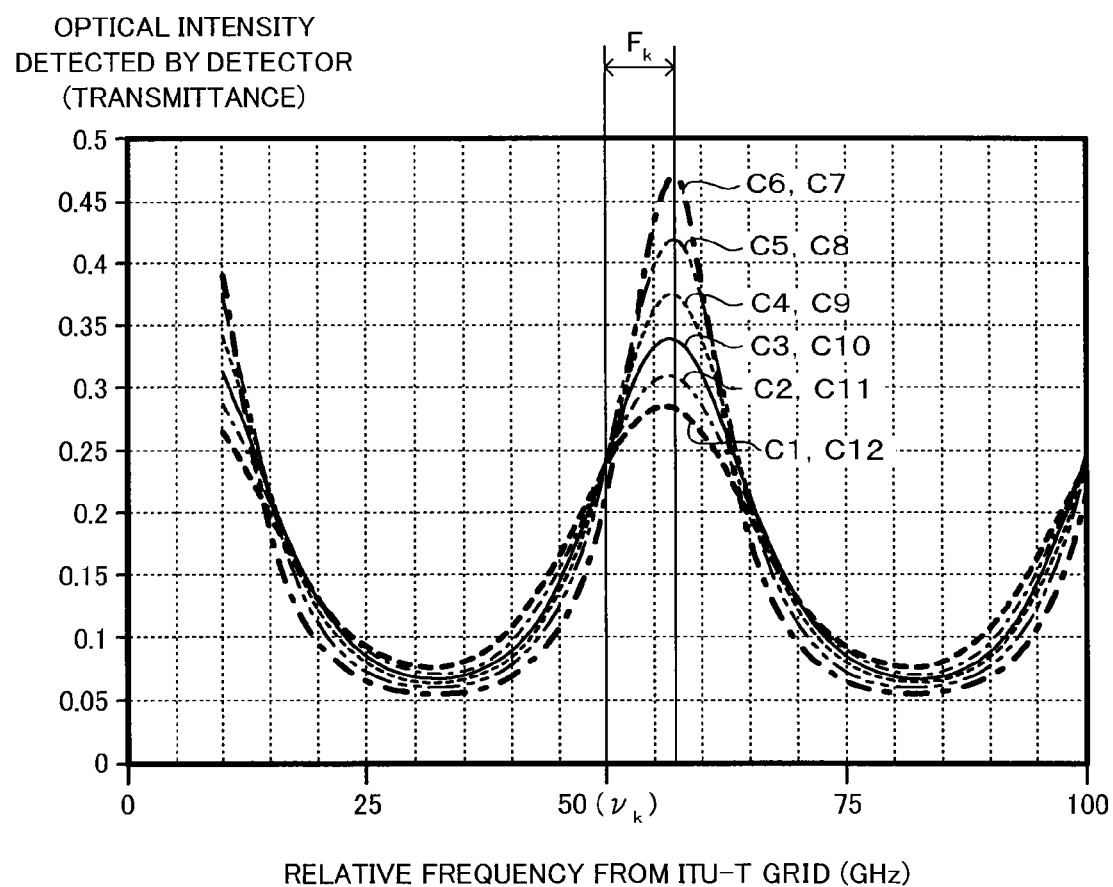
FIG. 8 is a diagram illustrating the relationship between the intensity of transmitted light detected by a detector, and the frequency of the transmitted light, according to a comparative example.

In addition, each of the curves C1 to C12 in FIG. 8 indicates the relationship between the intensity and frequency of transmitted light detected for each of the light sources L1 to L12 from the example illustrated in FIG. 6, and indicates the transmitting characteristics of the filter 30 for light from each of the light sources L1 to L12. Since $f_k$ is defined as the sum of $v_k$ and $F_k$ irrespective of the value of k, the frequencies corresponding to the peaks in the curves C1 to C12 ($f_k$) are all greater than $v_k$.

In addition, as FIGS. 5 to 8 demonstrate, as the magnitude of the Y coordinate value of an emission point increases, the peak in the transmitting characteristics decreases greatly, and frequency dependency decreases greatly. For this reason, the fluctuation range of the output from the detector 40 when the frequency of transmitted light fluctuates near $v_k$ may also conceivably decrease. By extension, the sensitivity of wavelength monitoring may conceivably become lower.

In contrast to these comparative examples, in the present embodiment, $f_k$ is appropriately defined as the sum or difference of $v_k$ and $F_k$ according to the value of k. For this reason, it becomes possible to dispose the emission points of the light sources L1 to L12 at positions where the magnitudes of the Y coordinate values are comparatively small. Thus, the magnitude of the propagation angle θ of light from the light sources L1 to L12 becomes smaller. Consequently, as illustrated in FIG. 4, the great decrease in the peaks of the transmitting characteristics is moderated, and the decrease in the frequency dependency of the transmitting characteristics is moderated. By extension, the sensitivity of the wavelength monitor 10 may be improved.

Also, the value of $F_k$ is determined such that the magnitude of the slope of the transmitting characteristics at $v_k$ is as large as possible. For this reason, the wavelength monitor 10 is able to monitor wavelength on the basis of a region of high frequency dependency from among the transmitting characteristics. Thus, the sensitivity of the wavelength monitor 10 may be improved.

In addition, as illustrated in FIG. 4, the intensities of transmitted light that are detected when the frequency of light from the light sources L1 to L12 becomes $v_k$ are all values that are approximately equal to each other (approximately 0.2 to 0.25). Thus, high-precision monitoring becomes possible.

In addition, the propagation angles θ of light from the light sources L1 to L6 are negative values, whereas the propagation angles θ of light from the light sources L7 to L12 are positive values. For this reason, the magnitudes of the propagation angle θ become smaller compared to the case in which the values of the propagation angle θ are all positive (or negative), for example. Thus, the wavelength monitor 10 is able to monitor wavelength on the basis of transmitting characteristics with high frequency dependency.

Also, the magnitude of the propagation angle θ of light from each of the light sources L1 to L6 is equal to the magnitude of the propagation angle θ of light from each of the light sources L12 to L7, respectively. If a pair of light sources whose propagation angles θ are of equal magnitude are driven and the position of the lens 22 is actively adjusted, a worker or the like is easily able to conduct the adjustment work. Particularly, when the pair of light sources used for adjustment are the outermost light sources L1 and L12, a worker or the like is able to precisely adjust the position.

Also, the propagation angles θ of light from the light sources L1 to L12 are all equal to or greater than 0.7 degrees. For this reason, the ratio of optical feedback reflecting off the surface of the filter 30 and returning to the light sources L1 to L12 becomes −50 dB or less. Thus, multimode oscillation of a semiconductor laser due to optical feedback is moderated.

The sign for defining $f_k$ is determined using the above Eq. (3). Consequently, the sign for defining $f_k$ is alternately determined to be a positive sign and a negative sign as the emission point of the kth light source corresponding to $f_k$ becomes farther distant from the Y-coordinate origin. Specifically, the sign for defining $f_k$ (where k=6, 5, . . . , 1) for each of the light sources L6 to L1 according to the present embodiment is alternately determined to be a negative sign and a positive sign. Likewise, the sign for defining $f_k$ (where k=7, 8, . . . , 12) for each of the light sources L7 to L12 is alternately determined to be a negative sign and a positive sign (see FIG. 2). For this reason, as a result of densely placing the emission points of the light sources, the magnitude of the propagation angle θ decreases, and the sensitivity of the wavelength monitor 10 improves.

Embodiment 2

Next, the points in which Embodiment 2 differs from the foregoing Embodiment 1 will primarily be described. Note that parts of the configuration that are identical or similar to Embodiment 1 will use similar reference signs, and description thereof will be omitted or reduced.

The wavelength monitor 10 according to the present embodiment differs from that according to Embodiment 1 in that optical waveguides are provided.

Figure 9:
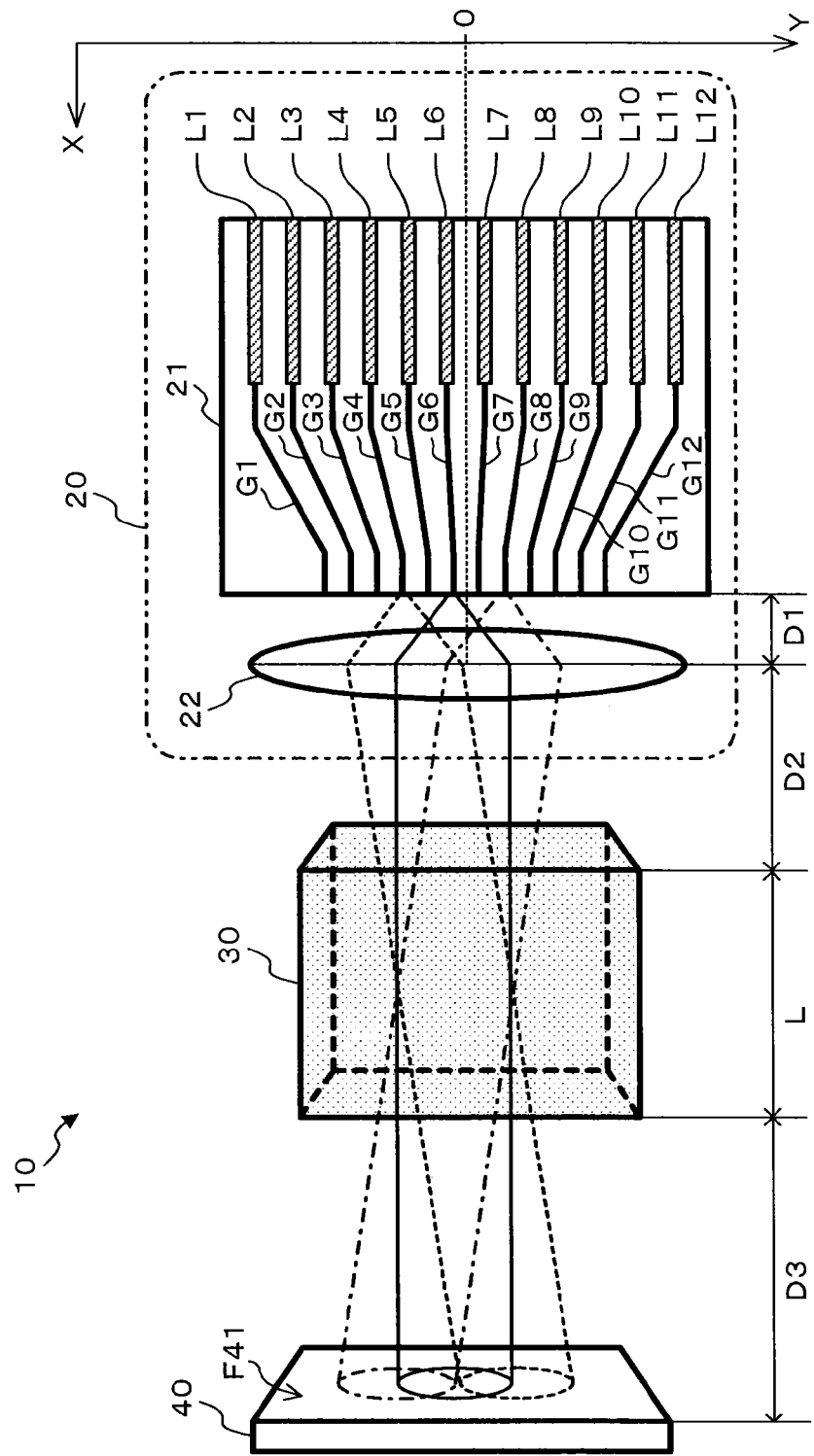
FIG. 9 is a diagram illustrating a configuration of a wavelength monitor according to Embodiment 2.

As illustrated in FIG. 9, optical waveguides G1 to G12 are formed on the semiconductor substrate 21 according to the present embodiment. Each of the optical waveguides G1 to G12 encloses light from each of the light sources L1 to L12 in a tiny region, and guides the light in the directions indicated by the bold lines in FIG. 9. Subsequently, each of the optical waveguides G1 to G12 emit the light from each of the light sources L1 to L12 from a position similar to the emission point of each of the light sources L1 to L12 according to Embodiment 1.

Figure 10:
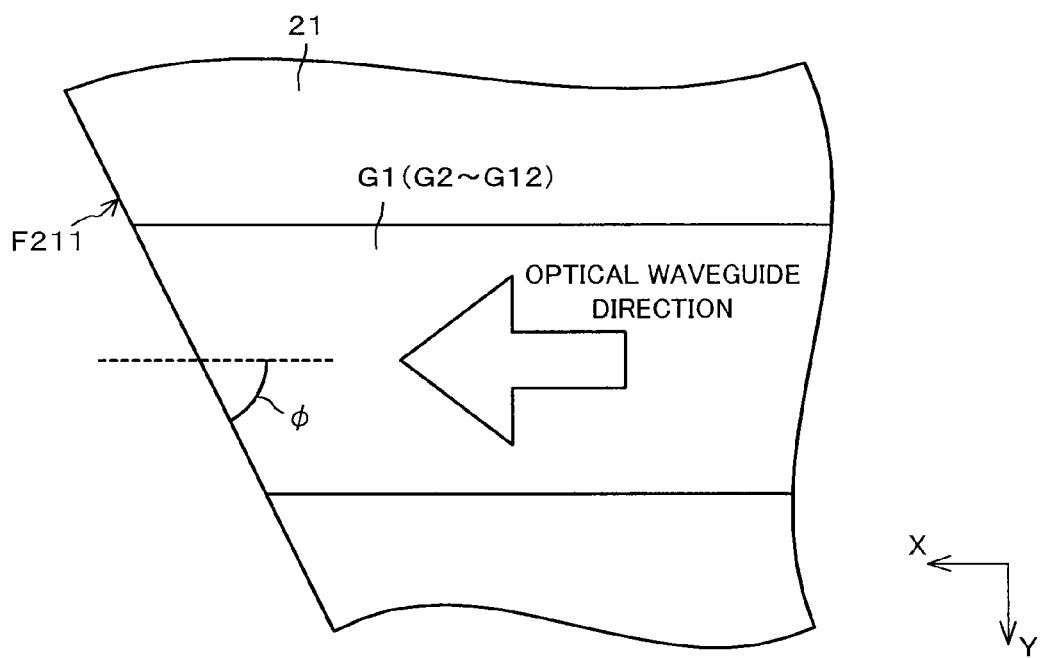
FIG. 10 is a diagram illustrating an enlarged view of an emission point.

Note that, as illustrated by the enlarged view in FIG. 10, the edge face F211 of the semiconductor substrate 21 is formed such that the angle φ obtained between the edge face F211 and the direction in which light is conveyed by the optical waveguides G1 to G12 becomes a certain angle. The angle φ is an angle less than or equal to 85 degrees, for example.

As described above, the optical waveguides G1 to G12 according to the present embodiment guide light from the light sources L1 to L12, and emit light from emission points disposed similarly to the emission points according to Embodiment 1. In the case of using semiconductor lasers as the light sources L1 to L12, structural constraints may require securing a pitch between the semiconductor lasers that is greater than a fixed distance. On the other hand, it is possible to make the pitch between the optical waveguides G1 to G12 smaller than the pitch between the semiconductor lasers. For this reason, it is possible to easily make the spacing between the emission points of light smaller.

In addition, it becomes possible to dispose the light sources L1 to L12 at arbitrary positions. For example, it becomes possible to dispose the light sources L1 to L12 with equal spacing.

Also, since the angle φ is less than or equal to 85 degrees, it is possible to decrease optical feedback reflecting off the edge face F211 and returning to the light sources L1 to L12, and make the behavior of the semiconductor lasers more consistent.

Embodiment 3

Next, the points in which Embodiment 3 differs from the foregoing Embodiment 1 will primarily be described. Note that parts of the configuration that are identical or similar to Embodiment 1 will use similar reference signs, and description thereof will be omitted or reduced.

The wavelength monitor 10 according to the present embodiment differs from that according to Embodiment 1 in that at least a fixed distance is secured as the spacing between the emission points of light.

FIG. 11 illustrates the Y coordinate value of the emission point of each of the light sources L1 to L12. As illustrated in FIG. 11, the magnitude of the Y coordinate value is 45 μm or less in all cases. Also, the emission points of the light sources L1 to L12 are all separated from the neighboring emission points by a distance equal to or greater than a threshold. The threshold is 3 μm, for example.

The emission points of the light sources L1 to L12 are disposed such that, provided that $f_k$ is defined as the difference between $v_k$ and $F_k$ for the light sources L1, L2, L4, L6, L7, L9, L11, and L12, and that $f_k$ is defined as the sum of $v_k$ and $F_k$ for the light sources L3, L5, L8, and L10, the propagation angle $\theta$ of light from the kth light source equals the angle $\theta_k$ indicated by the earlier Eq. (1).

Figure 12:
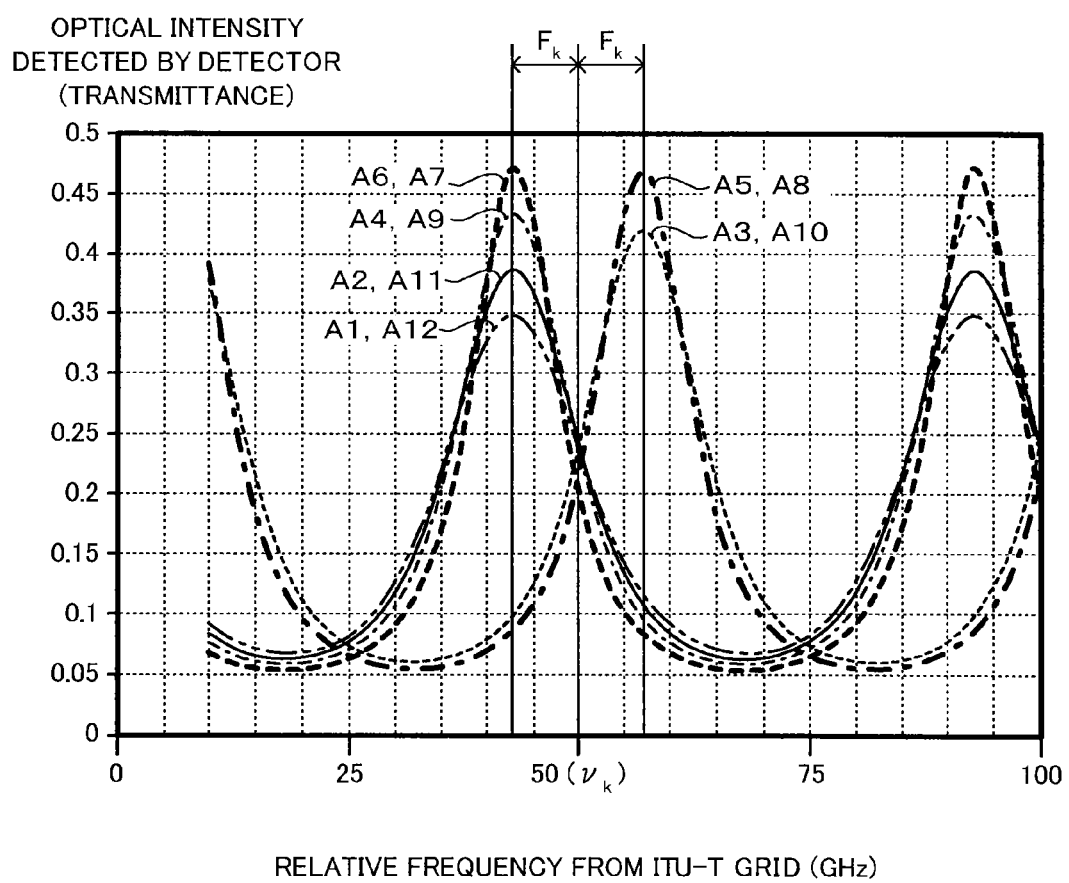
FIG. 12 is a diagram illustrating the relationship between the intensity of transmitted light detected by a detector, and the frequency of the transmitted light.

FIG. 12 illustrates the relationship between the intensity and frequency of transmitted light detected by the detector 40. As illustrated in FIG. 12, the frequencies corresponding to the peaks of the curves A1 and A12 according to the present embodiment are less than $v_k$.

As described above, the emission points of the light sources L1 to L12 according to the present embodiment are disposed with a spacing of 3 μm or more between the neighboring emission points. Thus, light emitted from each of the light sources L1 to L12 is prevented from optically coupling with light emitted from the neighboring light sources L1 to L12.

Also, the frequency dependency of the transmitting characteristics indicated by the curves A1 and A12 in FIG. 12 is greater than that of the case in which $f_k$ is defined as the sum (or difference) of $v_k$ and $F_k$ irrespective of the value of k (see FIGS. 7 and 8). For this reason, the sensitivity of the wavelength monitor 10 may be improved versus these cases.

Note that although the case in which optical waveguides are not formed on the semiconductor substrate 21 is described, advantageous effects similar to the present embodiment are also conceivably obtained in the case in which optical waveguides G1 to G12 are provided on the semiconductor substrate 21 similarly to Embodiment 2. Specifically, by separating the semiconductor lasers from each other by a distance equal to or greater than a threshold, the light guided by each of the optical waveguides G1 to G12 is conceivably prevented from optically coupling with the light guided by the neighboring optical waveguides G1 to G12.

Embodiment 4

Next, the points in which Embodiment 4 differs from the foregoing Embodiment 3 will primarily be described. Note that parts of the configuration that are identical or similar to Embodiment 3 will use similar reference signs, and description thereof will be omitted or reduced.

The present embodiment differs from Embodiment 3 in that the value of $F_k$ differs according to the value of k.

FIG. 13 illustrates the Y coordinate value of the emission points of light, the propagation angle $\theta$, and the positive or negative sign for defining $f_k$, according to the present embodiment. This propagation angle $\theta$ is equal to $\theta_k$ indicated by the above Eq. (1), under the condition where a value that differs according to the value of k is defined as $F_k$.

Figure 14:
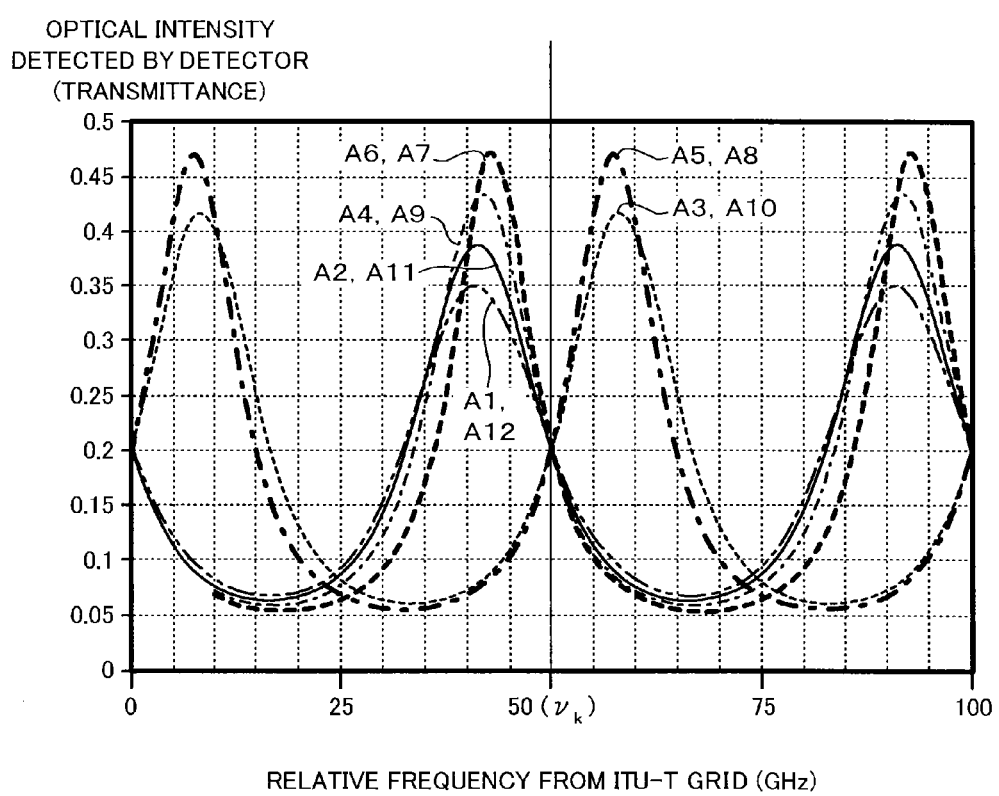
FIG. 14 is a diagram illustrating the relationship between the intensity of transmitted light detected by a detector, and the frequency of the transmitted light.

FIG. 14 illustrates the relationship between the intensity and frequency of transmitted light detected by the detector 40. By defining a value that differs according to the value of k as $F_k$, the intensity of transmitted light indicated by the curves A1 to A12 in FIG. 14 all become values equal to a reference value (0.2) when the frequency is $v_k$.

As described above, $F_k$ according to the present embodiment is a value by which, when light from each of the light sources L1 to L12 is transmitted through the filter 30, the intensities of the transmitted light at the frequency $v_k$ detected by the detector 40 all become equal to a reference value. Thus, since the intensity of transmitted light detected when the frequency of the light from each of the light sources L1 to L12 becomes $v_k$ becomes a value equal to the reference value in all cases, extremely precise wavelength monitoring becomes possible.

Embodiment 5

Next, the points in which Embodiment 5 differs from the foregoing Embodiment 1 will primarily be described. Note that parts of the configuration that are identical or similar to Embodiment 1 will use similar reference signs, and description thereof will be omitted or reduced.

Figure 15:
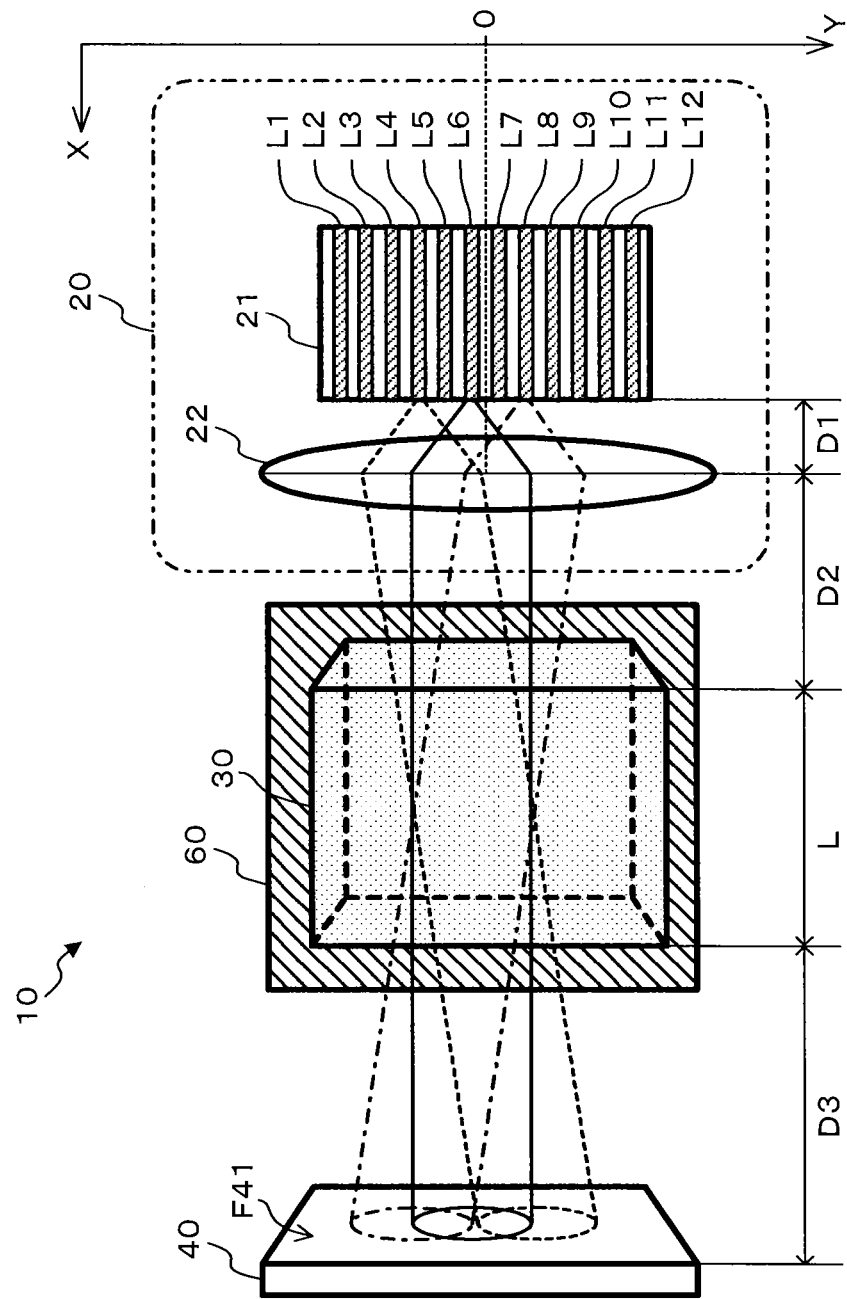
FIG. 15 is a diagram illustrating a configuration of a wavelength monitor according to Embodiment 5.

As illustrated in FIG. 15, the wavelength monitor 10 according to the present embodiment includes a filter temperature adjuster 60 that adjusts the temperature of the filter 30. The filter temperature adjuster 60 is a Peltier element, for example. Also, the filter 30 is provided on top of the filter temperature adjuster 60.

As described above, the wavelength monitor 10 includes a filter temperature adjuster 60. In the case of manufacturing a wavelength monitor 10 according to Embodiments 1 to 4, it is anticipated that variation in the quality of the wavelength monitor 10 may occur depending on the manufacturing precision.

However, by suitably adjusting the temperature of the filter 30 with the filter temperature adjuster 60, it becomes possible to compensate for such variation. Thus, degradation in the transmitting characteristics of the filter 30 is moderated. For example, if the temperature of the filter 30 is adjusted over a range from −20° C. to +20° C., the allowable range of lens 22 misalignment becomes approximately −2.5 μm to +2.5 μm.

Embodiment 6

Next, the points in which Embodiment 6 differs from the foregoing Embodiment 1 will primarily be described. Note that parts of the configuration that are identical or similar to Embodiment 1 will use similar reference signs, and description thereof will be omitted or reduced.

Figure 16:
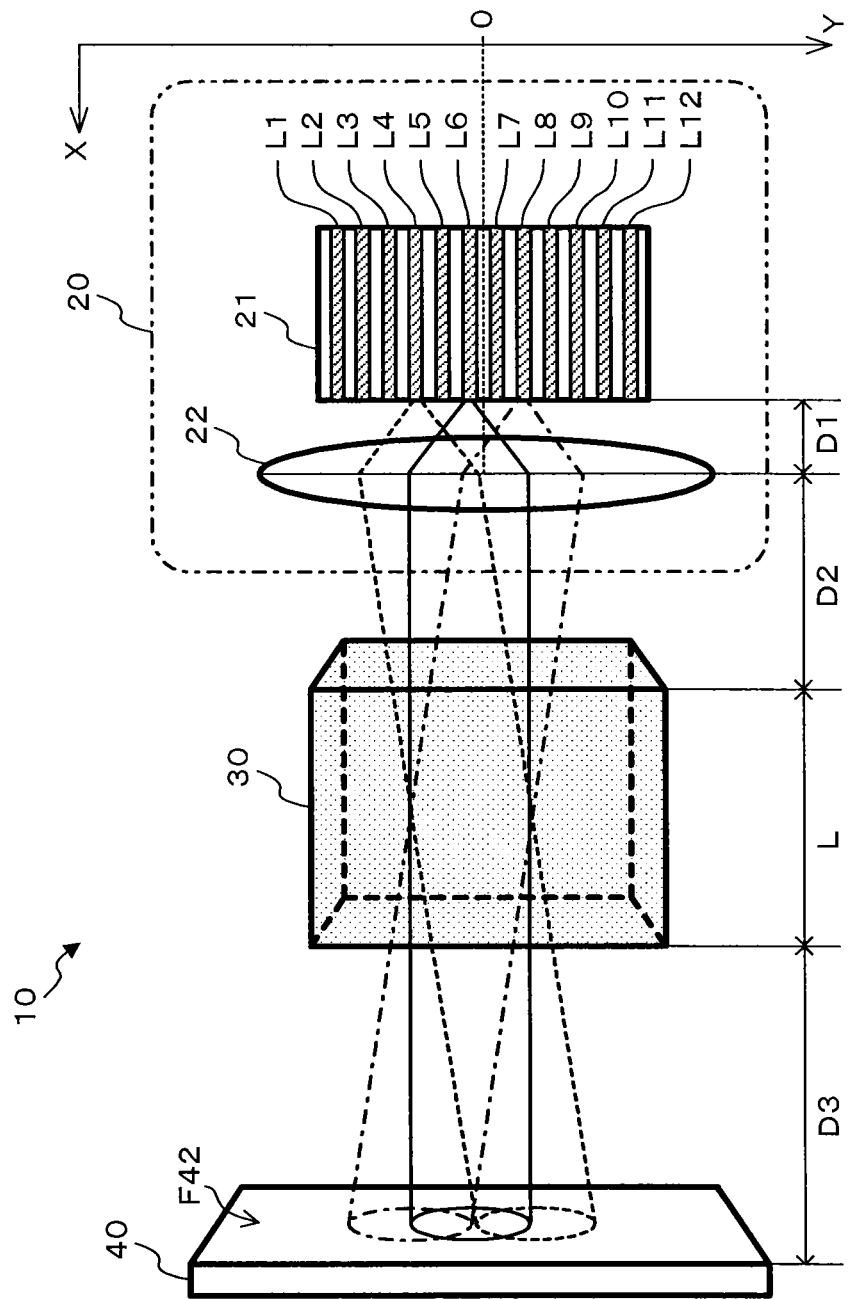
FIG. 16 is a diagram illustrating a configuration of a wavelength monitor according to Embodiment 6.

As illustrated in FIG. 16, the present embodiment differs from Embodiment 1 in that the detector 40 includes a light-sensing face F42. The light-sensing face F42 is disposed orthogonal to an axis parallel to the X axis. The shape of the light-sensing face F42 is rectangular, taking the direction parallel to the Y axis as the longer direction.

As a result, even in the case of a large propagation angle $\theta$, the detector 40 is still able to sense transmitted light that is transmitted through the filter 30, and detect the intensity of transmitted light. For example, when the number of integrated semiconductor lasers formed on the semiconductor substrate 21 is increased, the detector 40 is able to sense transmitted light from the semiconductor lasers at positions that are comparatively distant from the center axis of the lens 22.

Embodiment 7

Next, the points in which Embodiment 7 differs from the foregoing Embodiment 1 will primarily be described. Note that parts of the configuration that are identical or similar to Embodiment 1 will use similar reference signs, and description thereof will be omitted or reduced.

Figure 17:
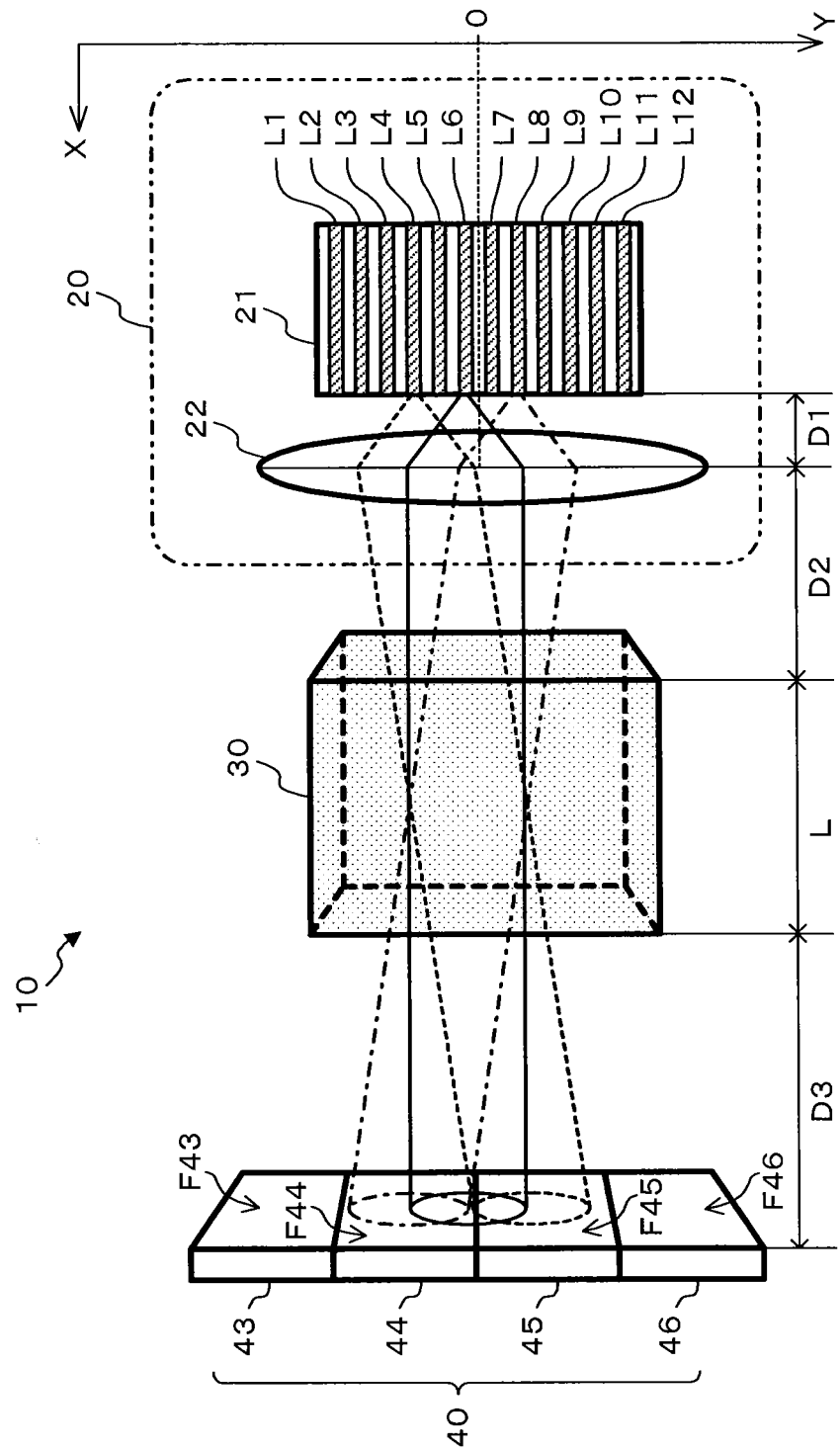
FIG. 17 is a diagram illustrating a configuration of a wavelength monitor according to Embodiment 7.

As illustrated in FIG. 17, the present embodiment differs from Embodiment 1 in that the detector 40 includes multiple detector elements 43 to 46. The detector elements 43 to 46 are disposed in an array in a direction parallel to the Y axis. In addition, the detector elements 43 to 46 include light-sensing faces F43 to F46, respectively. The light-sensing faces F43 to F46 are respectively disposed adjacent to each other, and orthogonal to an axis parallel to the X axis.

As a result, even in the case of a large propagation angle θ, the detector 40 is still able to sense transmitted light that is transmitted through the filter 30, and detect the intensity of transmitted light.

Embodiment 8

Next, the points in which Embodiment 8 differs from the foregoing Embodiment 5 will primarily be described. Note that parts of the configuration that are identical or similar to Embodiment 5 will use similar reference signs, and description thereof will be omitted or reduced.

The filter temperature adjuster 60 according to Embodiment 5 compensates for misalignment or the like of the lens 22 by adjusting the temperature of the filter 30. For this reason, it is assumed that the temperature of the filter 30 is kept to an approximately constant temperature in the case of monitoring the wavelength of light from any light source among the light sources L1 to L12. However, the present embodiment differs from Embodiment 5 in that the temperature of the filter 30 is adjusted according to the light source that is emitting light.

Figure 18:
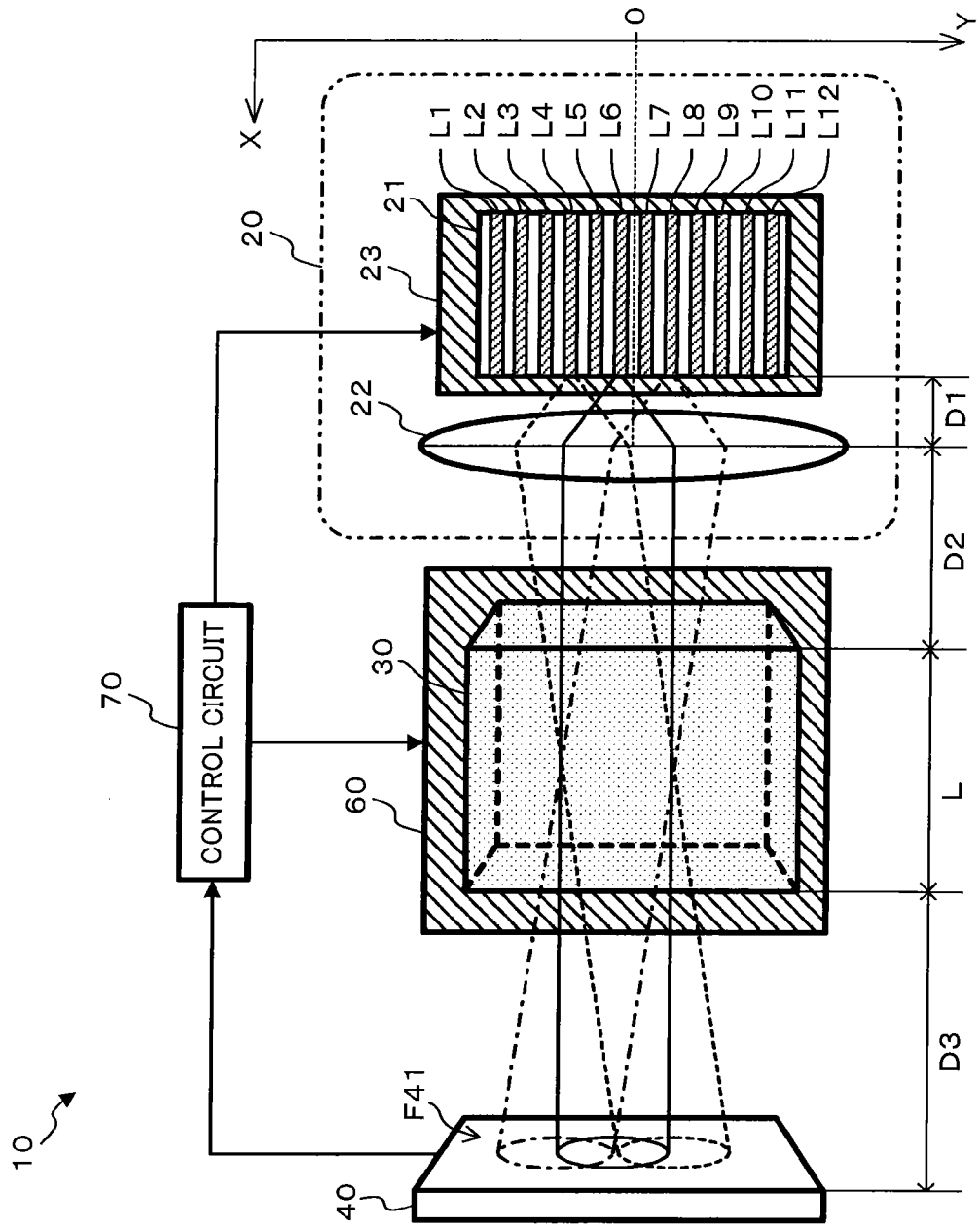
FIG. 18 is a diagram illustrating a configuration of a wavelength monitor according to Embodiment 8.

A wavelength monitor 10 according to the present embodiment configures an optical module capable of emitting light at a frequency equal to a wavelength lock frequency ($v_k$). As illustrated in FIG. 18, the wavelength monitor 10 includes an incidence guide 20, a filter 30, a detector 40, a filter temperature adjuster 60, and a control circuit 70.

The incidence guide 20 according to the present embodiment includes an LD temperature adjuster 23. The LD temperature adjuster 23 is a Peltier element, for example. The semiconductor substrate 21 is provided on top of the LD temperature adjuster 23. The LD temperature adjuster 23 adjusts the temperature of the light sources L1 to L12 according to an electrical signal input from the control circuit 70. The light sources L1 to L12, whose temperature is adjusted by the LD temperature adjuster 23, emit light at a wavelength according to that temperature.

The refractive index of the filter 30 at 25° C. is approximately 1.52. Also, the temperature characteristic dn/dt of the refractive index of the filter 30 is $-5.1 \times 10^{-6}$. The coefficient of linear expansion in the direction parallel to the C axis of the filter 30 (crystal etalon) is $7.7 \times 10^{-6}$ K$^{-1}$.

The filter temperature adjuster 60 adjusts the temperature of the filter 30 according to an electrical signal input from the control circuit 70. The transmitting characteristics of the filter 30, whose temperature is adjusted by the filter temperature adjuster 60, vary according to that temperature. For example, if the temperature of the filter 30 rises, the curves A1 to A12 indicating transmitting characteristics in FIG. 4 move in parallel towards higher frequency.

The control circuit 70 causes light at a frequency equal to $v_k$ to be emitted from each of the light sources L1 to L12, by transmitting signals to the LD temperature adjuster 23 and the filter temperature adjuster 60 on the basis of a signal output from the detector 40.

Next, control executed by the control circuit 70 will be described using FIGS. 19 to 23.

Figure 19:
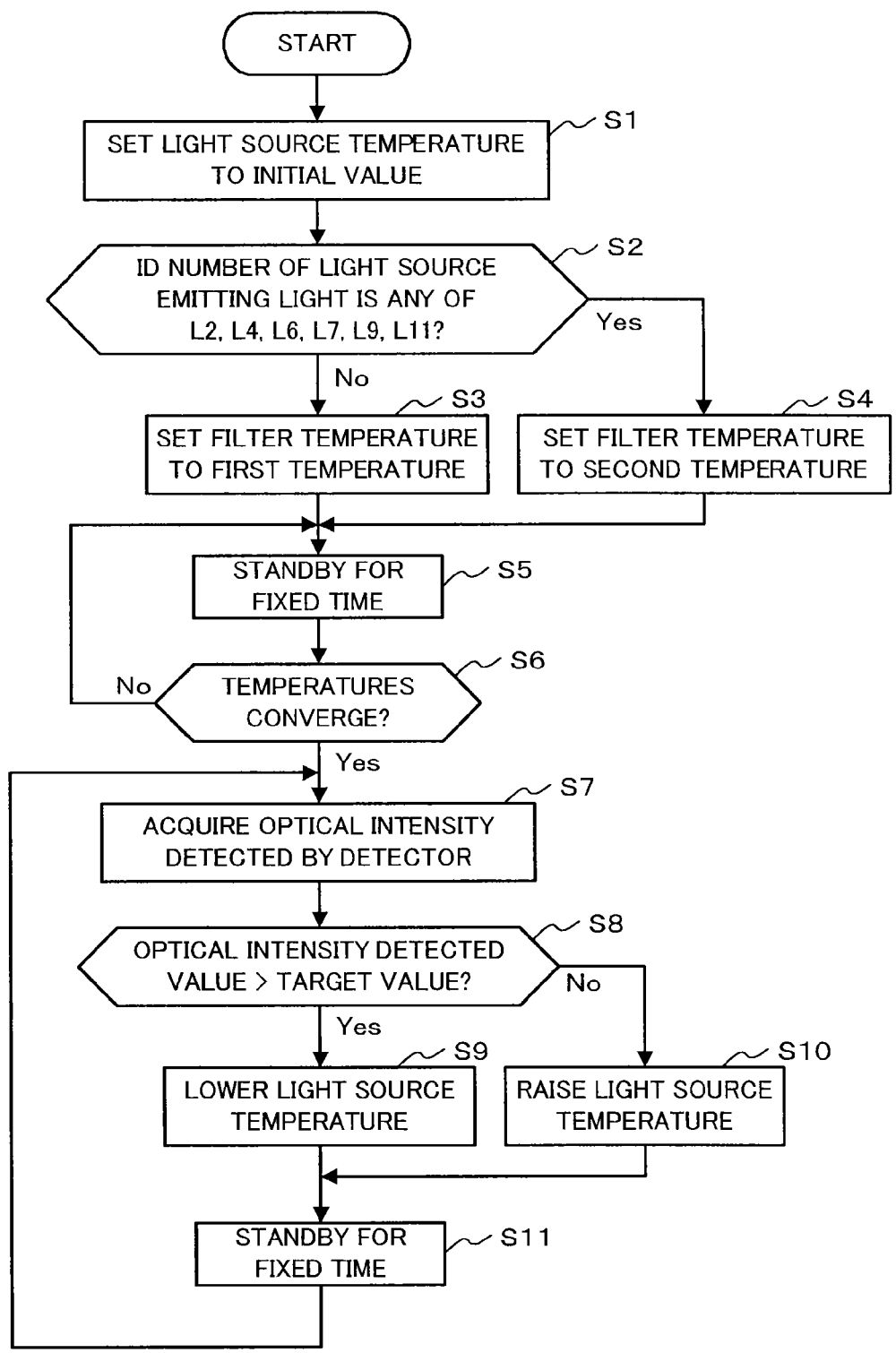
FIG. 19 is a flowchart illustrating a series of processes executed by a control circuit.

FIG. 19 illustrates a series of control processes by the control circuit 70. These control processes are executed when one of the light sources L1 to L12 starts emitting light.

As illustrated in FIG. 19, the control circuit 70 first sets the temperature of the light sources L1 to L12 to an initial value (step S1). This initial value is a temperature corresponding to a $v_k$ specified from outside the wavelength monitor 10. For example, if the user of the optical module uses a switch provided on the optical module to select $v_1$, the control circuit 70 sets the temperature of the light source L1 to a predetermined initial value by transmitting an electrical signal to the LD temperature adjuster 23. This initial value is the average temperature when emitting light at the frequency $v_1$ from the light source L1 at the time of factory shipment, for example.

Next, the control circuit 70 determines whether or not the identification number of the light source emitting light corresponds to any of L2, L4, L6, L7, L9, and L11 (step S2). In other words, the control circuit 70 determines whether or not light is being emitted from a light source disposed such that the propagation angle θ of light is equal to $θ_k$ according to Embodiment 5, provided that $f_k$ is defined as the difference between $v_k$ and $F_k$. Herein, when the temperature of the filter 30 is a fixed temperature (first temperature T1), each of the light sources L1 to L12 is disposed such that the propagation angle θ of light from each of the light sources L1 to L12 equals the angle $θ_k$ according to Embodiment 5. Consequently, if the temperature of the filter 30 becomes a temperature different from the first temperature T1, the propagation angle θ of light from each of the light sources L1 to L12 becomes a value different from the angle $θ_k$ according to Embodiment 5.

In the case of a negative determination in step S2 (step S2; No), the control circuit 70 sets the temperature of the filter 30 to the first temperature T1 (step S3). The first temperature T1 is 25.0° C., as illustrated in correspondence with the light sources L1, L3, L5, L8, L10, and L12 in FIG. 20. Consequently, light from the light sources L1, L3, L5, L8, L10, and L12 propagates inside the filter 30 at a propagation angle θ that is equal to the angle $θ_k$ indicated in the above Eq. (1), provided that $f_k$ is defined as the sum of $v_k$ and $F_k$.

Figure 21:
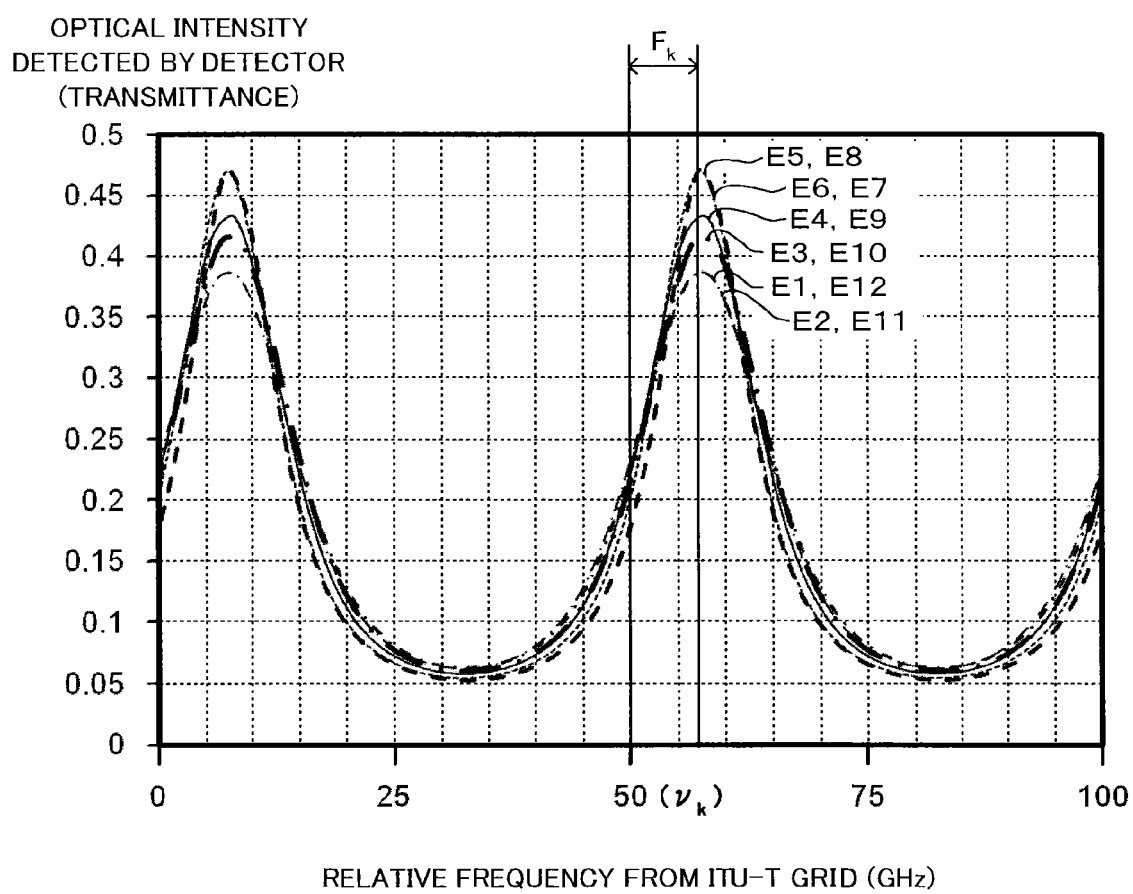
FIG. 21 is a diagram illustrating the relationship between the intensity of transmitted light detected by a detector, and the frequency of the transmitted light.

Each of the curves E1 to E12 in FIG. 21 indicates the relationship between the intensity and frequency of transmitted light detected for each of the light sources L1 to L12, and indicates the transmitting characteristics of the filter 30 for light from each of the light sources L1 to L12. Note that the curves E1, E3, E5, E8, E10, and E12 indicate transmitting characteristics that are similar to the transmitting characteristics indicated by the curves A1, A3, A5, A8, A10, and A12 according to Embodiment 1 (see FIG. 4). As FIG. 21 demonstrates, the peak frequency ($f_k$) of the transmitting characteristics indicated by the curves E1, E3, E5, E8, E10, and E12 is greater than $v_k$ by $F_k$.

After that, the control circuit 70 moves the process to step S5.

On the other hand, in the case of a positive determination in step S2 (step S2; Yes), the control circuit 70 sets the temperature of the filter 30 to a second temperature T2 different from the first temperature T1 (step S4). This second temperature T2 is 68.2° C., as illustrated in correspondence with the light sources L2, L4, L6, L7, L9, and L11 in FIG. 20. The second temperature T2 is predetermined such that the propagation angle θ of light from the light sources L2, L4, L6, L7, L9, and L11 equals the angle $θ_k$ indicated in the above Eq. (1), provided that $f_k$ is defined as the sum of $v_k$ and $F_k$. For this reason, as FIG. 21 demonstrates, the peak frequency ($f_k$) of the transmitting characteristics indicated by the curves E2, E4, E6, E7, E9, and E11 is greater than $v_k$ by $F_k$. After that, the control circuit 70 moves the process to step S5.

Note that by setting the temperature of the filter 30 to the second temperature T2, the curves E2, E4, E6, E7, E9, and E11 illustrated in FIG. 21 correspond to moving the curves A2, A4, A6, A7, A9, and A11 according to Embodiment 1 (see FIG. 4) toward higher frequency.

In step S5, the control circuit 70 stands by for a fixed amount of time (one second, for example).

Next, the control circuit 70 determines whether or not the temperature of the light sources L1 to L12 set in step S1 and the temperature of the filter 30 set in step S3 or step S4 has converged (step S6). For example, the control circuit 70 determines whether or not the temperatures of the light sources L1 to L12 and the filter 30 have converged by using a sensor that measures the temperature of the light sources L1 to L12 and a sensor that measures the temperature of the filter 30. The control circuit 70 may also determine whether or not sufficient time for the temperatures to converge has elapsed since executing step S3 or step S4, without using a sensor.

In the case of determining that the temperatures do not converge (step S6; No), the control circuit 70 repeats the process in step S5 and thereafter. On the other hand, in the case of determining that the temperatures do converge (step S6; Yes), the control circuit 70 acquires the optical intensity detected by the detector 40 (step S7).

Next, the control circuit 70 determines whether or not the detected value of the optical intensity acquired in step S7 is greater than a target value (step S8). This determination will be described using the curve E13 illustrated in FIG. 22 as an example. The curve E13 indicates the calculated results of the relationship between the optical intensity and frequency detected when light from a light source L13 disposed as illustrated in FIG. 23 transmits through the filter 30, and indicates the calculated results of the transmitting characteristics of the filter 30 for the light from the light source L13.

Herein, the light source L13 is formed on top of the semiconductor substrate 21 such that the emission point of light passes along the optical axis of the lens 22. Also, in FIG. 23, the angle obtained between the C axis of the filter 30 (crystal etalon) and the optical axis of the lens 22 is 0.78 degrees.

Also, the temperature of the filter 30 is set to 68.2° C. by the filter temperature adjuster 60, and the peak frequency in the transmitting characteristics of the filter 30 for light from the light source L13 is greater than $v_k$ by $F_k$. In other words, the incidence guide 20 illustrated in FIG. 23 causes light from the light source L13 to be incident on the filter 30 such that the propagation angle θ of light is equal to $θ_k$ indicated in the above Eq. (1), provided that $f_k$ is defined as the sum of $v_k$ and $F_k$. Other parameters are the same as those according to the present embodiment.

Figure 22:
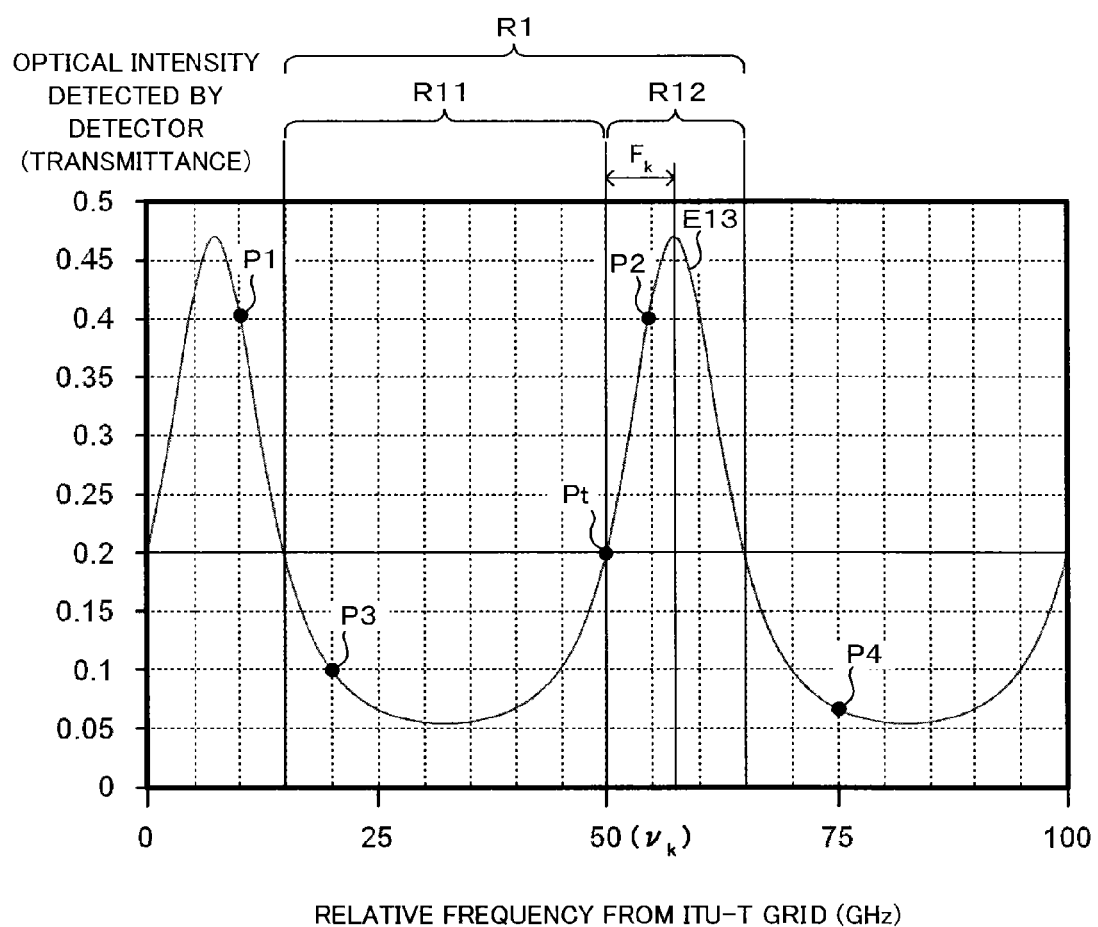
FIG. 22 is a diagram for explaining feedback control by a control circuit.
Figure 23:
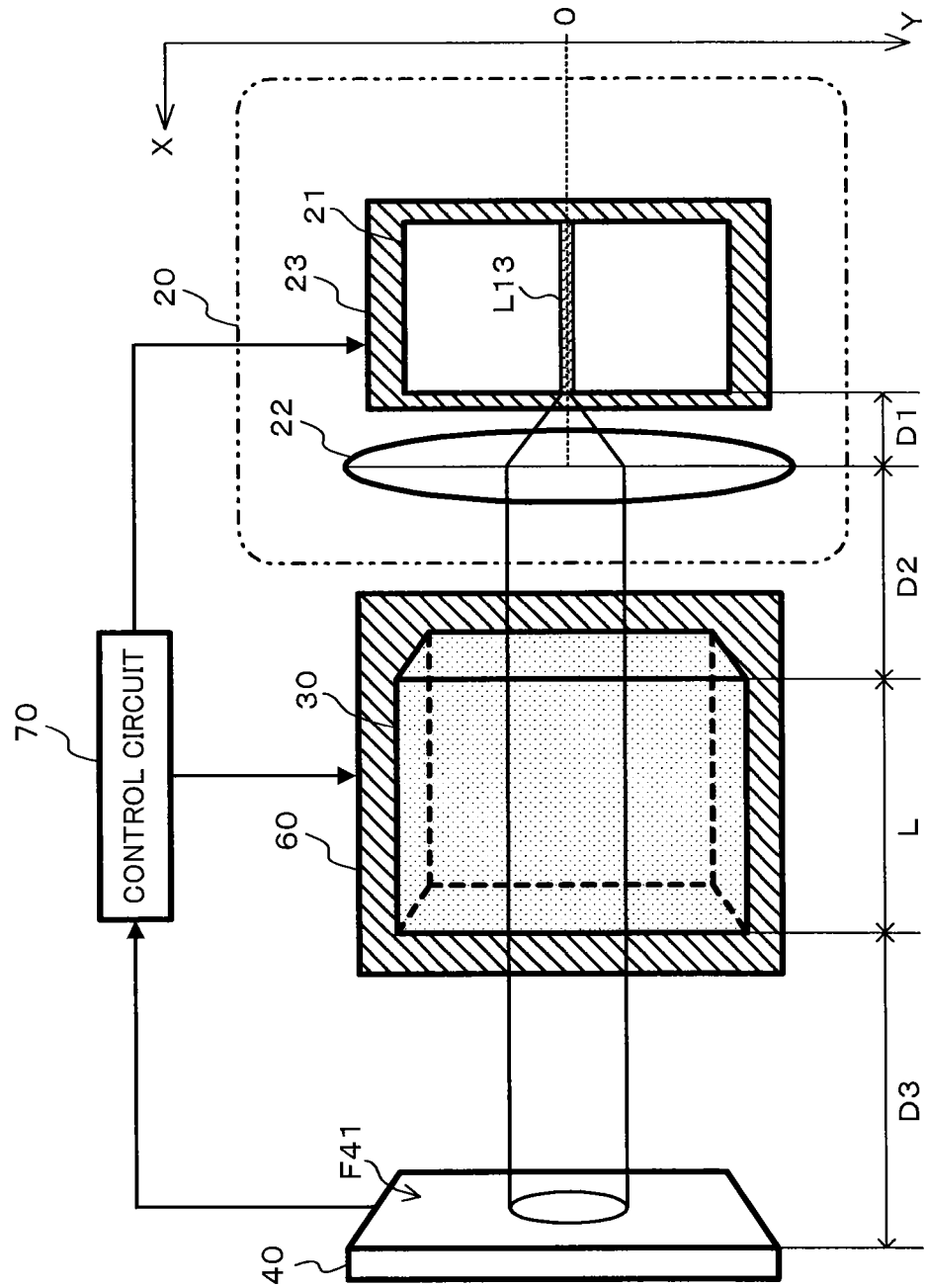
FIG. 23 is a diagram illustrating light source placement.

The target value of optical intensity according to the example illustrated in FIG. 23 is a value (0.2) corresponding to $v_k$ (50 GHz), as indicated by the point Pt in FIG. 22. Note that the point Pt indicates the state in which light at the frequency $v_k$ is emitted from the light source L13. Also, in FIG. 22, in the states indicated by the points P1 and P2, the optical intensity detected by the detector 40 is approximately 0.4, greater than the target value (0.2). In the states indicated by the points P3 and P4, the optical intensity detected by the detector 40 is less than or equal to the target value.

Returning to FIG. 19, in the case of determining that the detected value of the optical intensity is greater than the target value (step S8; Yes), the control circuit 70 lowers the temperature of the light source emitting light by transmitting an electrical signal to the LD temperature adjuster 23 (step S9). As a result, the frequency of light emitted from the light source lowers. For example, in the state indicated by the point P2 in FIG. 22, the temperature of the light source L13 is lowered, and the frequency of the light emitted from the light source L13 approaches $v_k$. Meanwhile, in the state indicated by the point P1, the temperature of the light source L13 is lowered, and the frequency of the light emitted from the light source L13 moves away from $v_k$. After that, the control circuit 70 moves the process to step S11.

On the other hand, in the case of determining that the detected value of the optical intensity is not greater than the target value (step S8; No), the control circuit 70 raises the temperature of the light source emitting light by transmitting an electrical signal to the LD temperature adjuster 23 (step S10). As a result, the frequency of light emitted from the light source rises. For example, in the state indicated by the point P3 in FIG. 22, the temperature of the light source L13 is raised, and the frequency of the light emitted from the light source L13 approaches $v_k$. Meanwhile, in the state indicated by the point P4, the temperature of the light source L13 is raised, and the frequency of the light emitted from the light source L13 moves away from $v_k$. After that, the control circuit 70 moves the process to step S11.

In step S11, the control circuit 70 stands by for a fixed amount of time (one second, for example). After that, the control circuit 70 repeats the process in step S7 and thereafter. As a result, as illustrated in FIG. 22, for example, the temperature of the light source L13 is adjusted such that the frequency of light emitted from the light source L13 approaches $v_k$ in the case in which the frequency of the light emitted from the light source L13 is within a wavelength capture range R11 on the lower-frequency side of $v_k$, or within a wavelength capture range R12 on the higher-frequency side of $v_k$. In other words, the frequency of light emitted from the light source L13 is controlled by the control circuit 70 to approach $v_k$ when within a capture range R1 that includes the wavelength capture ranges R11 and R12. Note that the width of the capture range R1 is 50 GHz, equal to the FSR of the filter 30, of which the width of the wavelength capture range R11 is computed to be 35.1 GHz, and the width of the wavelength capture range R12 is computed to be 14.9 GHz.

As illustrated in FIG. 22, the wavelength capture range R11 is wider than the wavelength capture range R12 for the light source L13. Also, as illustrated in FIG. 21, the temperature of the filter 30 is adjusted for all light sources L1 to L12 such that the peak frequency of the transmitting characteristics is greater than $v_k$ by $F_k$. For this reason, the wavelength capture range on the lower-frequency side of $v_k$ becomes wider than the wavelength capture range on the higher-frequency side of $v_k$ for all light sources L1 to L12, as illustrated in FIG. 20.

As described above, the control circuit 70 executes feedback control such that the detected value of the optical intensity becomes equal to a target value. Thus, the wavelength monitor 10 functions as a wavelength locker. However, since the transmittance of the filter 30 periodically varies with respect to frequency, when the frequency of light from a light source is outside a capture range, the frequency of light from the light source becomes a value different from $v_k$ as a result of the control by the control circuit 70.

At this point, two comparative examples will be described in order to explain the advantageous effects of the wavelength monitor 10 according to the present embodiment.

Figure 24:
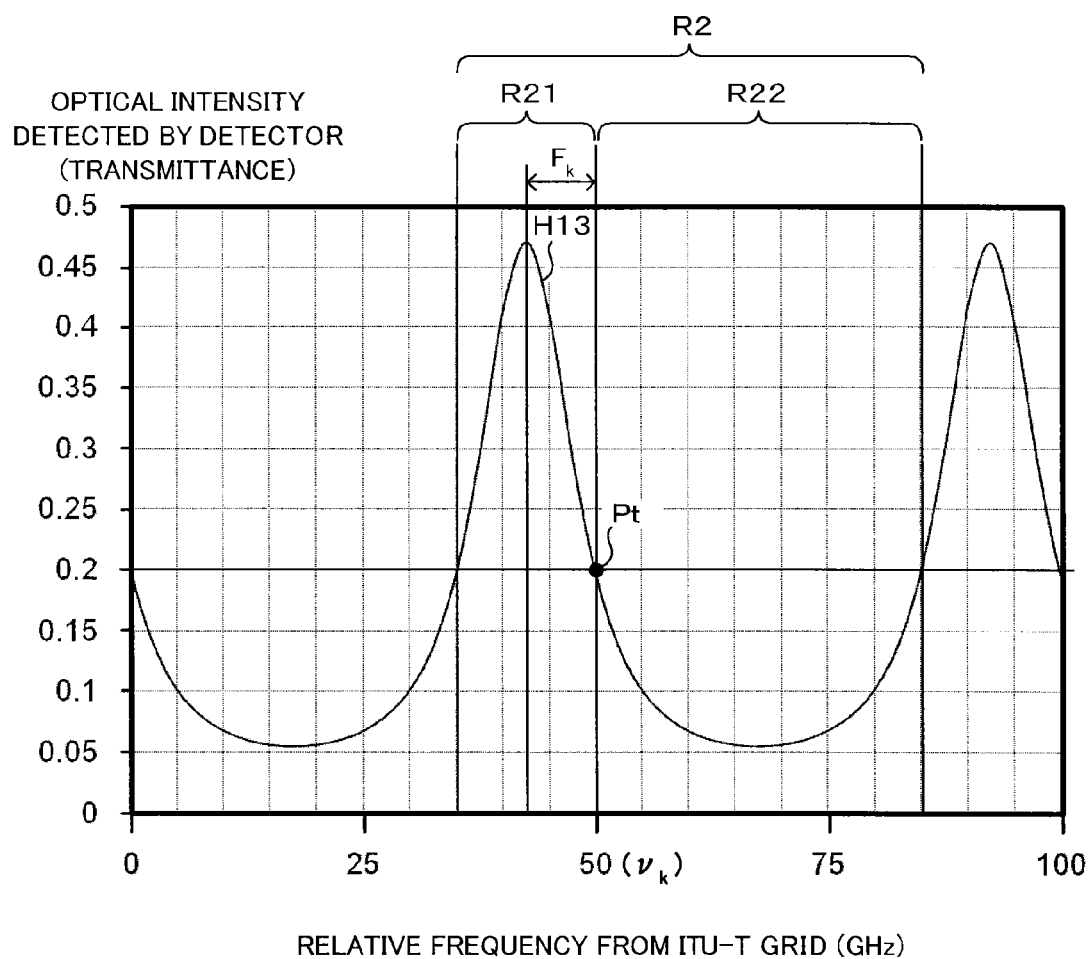
FIG. 24 is a diagram illustrating filter transmitting characteristics according to a comparative example.

In FIG. 24 calculated results according to one comparative example are indicated by the curve H13. The curve H13 indicates the relationship between the intensity and frequency of transmitted light detected when the temperature of the filter 30 is set to 25.0° C. in the example illustrated in FIG. 23, and indicates the transmitting characteristics of the filter 30 for light from the light source L13. As illustrated in FIG. 24, the peak frequency of the transmitting characteristics of the filter 30 according to this comparative example is less than $v_k$ by $F_k$. In other words, the incidence guide 20 according to the comparative example causes light from the light source L13 to be incident on the filter 30 such that the propagation angle θ of light is equal to $\theta_k$ indicated in the above Eq. (1), provided that $f_k$ is defined as the difference of $v_k$ and $F_k$.

The width of the capture range R2 according to the comparative example is 50 GHz, equal to the FSR of the filter 30, of which the width of the wavelength capture range R21 on the lower-frequency side of $v_k$ is computed to be 14.9 GHz, and the width of the wavelength capture range R22 on the higher-frequency side of $v_k$ is computed to be 35.1 GHz. The wavelength capture range R21 is narrower than the wavelength capture range R22. Herein, the control circuit 70 according to the comparative example executes feedback control by raising the temperature of the light source when the detected value of the optical intensity is greater than a target value, and by lowering the temperature of the light source when the detected value is less than or equal to the target value.

It has been established that the frequency of light emitted from a semiconductor laser may shift to lower frequency with age, even if the temperature of the semiconductor laser used as the light sources L1 to L13, as well as the current value flowing through this semiconductor laser, are kept constant. For this reason, it is desirable for the wavelength capture range on the lower-frequency side of $v_k$ to be wider than the wavelength capture range on the higher-frequency side of $v_k$, because this enables light at the frequency $v_k$ to be emitted from a light source even in the case in which the semiconductor laser has aged. Consequently, the transmitting characteristics indicated by the curve E13 in FIG. 22 may be considered to be more suitable for executing robust control with respect to semiconductor laser aging than the transmitting characteristics indicated by the curve H13 in FIG. 24.

FIG. 25 illustrates the temperature of the filter 30 and the widths of wavelength capture ranges according to another comparative example. In the case of setting the temperature of the filter 30 to 25.0° C. when light is emitted from any of the light sources L1 to L12, as illustrated in FIG. 25, the optical intensity detected by the detector 40 becomes like that illustrated in FIG. 26. Note that each of the curves H1 to H12 in FIG. 26 indicates the relationship between the intensity and frequency of transmitted light detected when light is emitted from each of the light sources L1 to L12, and indicates the transmitting characteristics of the filter 30 for light from each of the light sources L1 to L12. Also, each of the curves H1 to H12 indicates transmitting characteristics similar to the transmitting characteristics indicated by each of the curves A1 to A12 in FIG. 4.

Figure 26:
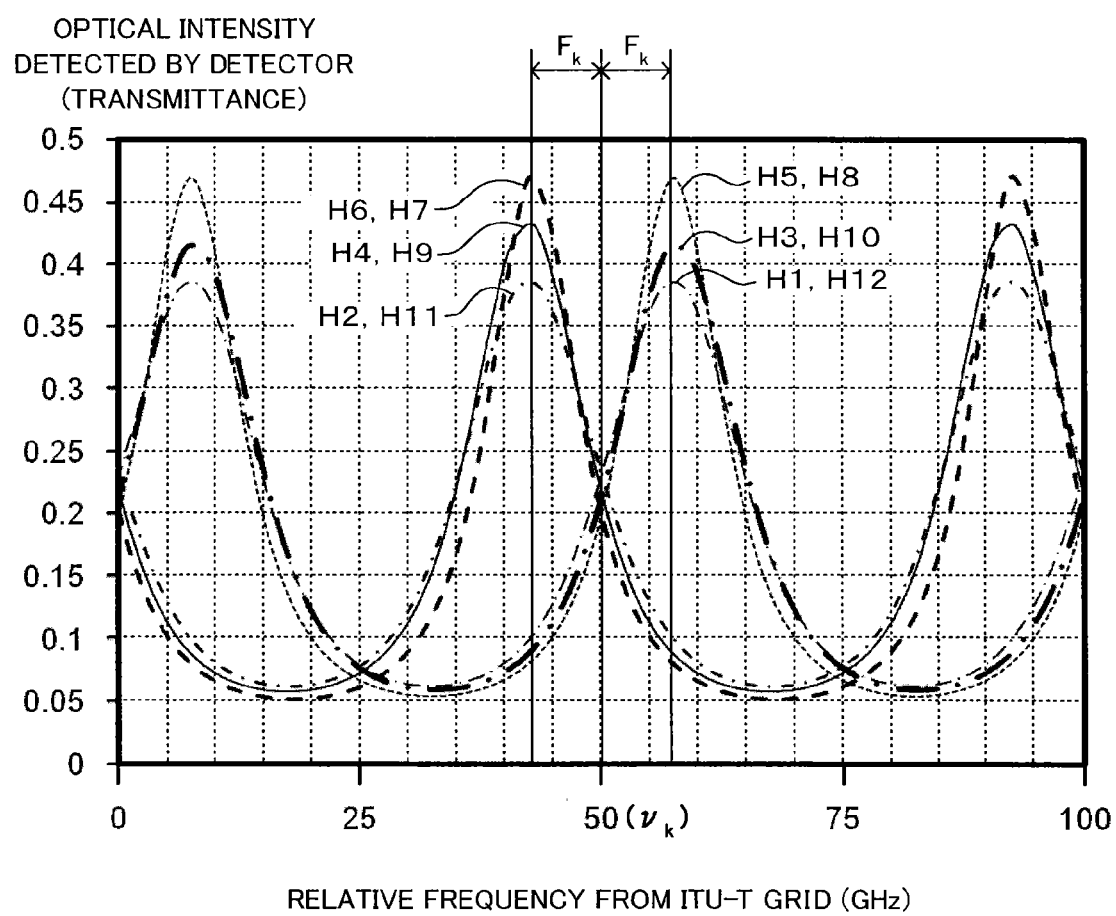
FIG. 26 is a diagram illustrating the relationship between the intensity of transmitted light detected by a detector, and the frequency of the transmitted light, according to a comparative example.

As FIG. 26 demonstrates, the peak frequency of the transmitting characteristics indicated by the curves H1, H3, H5, H8, H10, and H12 is greater than $v_k$ by $F_k$. For this reason, the wavelength capture range on the lower-frequency side of $v_k$ becomes wider than the wavelength capture range on the higher-frequency side of $v_k$ for each of the light sources L1, L3, L5, L8, L10, and L12. Consequently, the wavelength monitor is able to robustly control the frequency of emitted light with respect to aging of the light sources L1, L3, L5, L8, L10, and L12.

Meanwhile, the peak frequency of the transmitting characteristics indicated by the curves H2, H4, H6, H7, H9, and H11 is less than $v_k$ by $F_k$. For this reason, the wavelength capture range on the lower-frequency side of $v_k$ becomes narrower than the wavelength capture range on the higher-frequency side of $v_k$ for each of the light sources L2, L4, L6, L7, L9, and L11. Consequently, it is comparatively difficult for the wavelength monitor to robustly control the frequency of emitted light with respect to aging of the light sources L2, L4, L6, L7, L9, and L11.

Unlike this comparative example, in the present embodiment, by adjusting the temperature of the filter 30, the wavelength capture range on the lower-frequency side of $v_k$ is made wider than the wavelength capture range on the higher-frequency side of $v_k$ for all light sources L1 to L12. For this reason, it becomes possible for the wavelength monitor 10 to robustly control the frequency of emitted light with respect to aging for all of the light sources L1 to L12.

The foregoing thus describes embodiments for carrying out the present invention, but the present invention is not limited by the foregoing embodiments.

For example, in Embodiment 1, the incidence guide 20 uses a typical collimating lens as the lens 22, and by disposing the emission points of light at the positions illustrated in FIG. 2, causes light to be incident on the filter 30 such that the propagation angle θ of the light becomes an angle defined using the above Eq. (1). However, the configuration is not limited thereto. For example, by disposing the emission points of light with equal spacing, and using a lens 22 having a suitable surface shape, the incidence guide 20 may cause light to be incident on the filter 30 such that the propagation angle θ of the light becomes an angle defined using the above Eq. (1). Similarly, by using a lens 22 having a suitable refractive index distribution, the incidence guide 20 may cause light to be incident on the filter 30 such that the propagation angle θ of the light becomes an angle defined using the above Eq. (1).

Also, $f_k$ according to Embodiment 1 is defined as the sum of $v_k$ and $F_k$ when the value of Eq. (3) is an even number, and is defined as the difference between $v_k$ and $F_k$ when the value of Eq. (3) is an odd number, but is not limited thereto. For example, depending on design factors such as the length and refractive index of the etalon, defining $f_k$ as the difference between $v_k$ and $F_k$ when the value of Eq. (3) is an even number and as the sum of $v_k$ and $F_k$ when the value of Eq. (3) is an odd number may conceivably further improve the sensitivity of the wavelength monitor 10.

In addition, $f_k$ may also be defined irrespectively of the value of Eq. (3). For example, $f_k$ may be defined as the difference between $v_k$ and $F_k$ for the light sources L2, L3, L4, L6, L7, L9, L10, and L11, and defined as the sum of $v_k$ and $F_k$ for the light sources L1, L5, L8, and L12. The sensitivity of the wavelength monitor 10 may be improved by defining $f_k$ as the sum of $v_k$ and $F_k$ for at least one light source, and as the difference between $v_k$ and $F_k$ for at least one other light source.

Also, although the optical waveguides G1 to G12 according to Embodiment 2 emit light from emission points disposed at positions similar to Embodiment 1, the configuration is not limited thereto. For example, by using optical waveguides G1 to G12 with suitably designed angles of emergence, the incidence guide 20 may cause light to be incident on the filter 30 such that the propagation angle θ of the light becomes an angle defined using the above Eq. (1).

Also, in Embodiment 3, the spacing between emission points is a distance equal to or greater than a threshold of 3 μm. However, since the distance at which light optically couples differs depending on the semiconductor laser or optical waveguide design, it is necessary to select a suitable threshold according to the design values of the semiconductor lasers and the like.

In addition, the filter 30 according to each embodiment is an etalon having a gap 31 made of crystal, but is not limited thereto. For example, the gap 31 may also be a member made of quartz. Also, a wavelength monitor 10 may be configured with an air gap etalon that does not include the gap 31 as the filter 30. Additionally, the filter 30 may be a semiconductor substrate such as Si, GaAs, or InP, or a resonator or the like formed on top of a polymer or glass substrate.

Also, for the sake of clarity, each of the foregoing embodiments is described assuming that the refractive index of the filter 30 is a constant value irrespective of frequency, but the value of the angle $\theta_k$ may also be determined with consideration for the frequency dependency of the refractive index.

Also, in each of the foregoing embodiments, light is incident on the filter 30 such that the propagation angle $\theta$ of light from the kth light source equals $\theta_k$ indicated by Eq. (1). The configuration is not limited thereto, and instead of $\theta_k$ indicated by Eq. (1), light may be incident on the filter 30 such that $\theta_k$ indicated by Eq. (4) below and the propagation angle $\theta$ become equal.

$$\theta_k = \sqrt{2\left(\frac{2nLf_k}{m_k c} - 1\right)} \tag{4}$$

Eq. (4) is an approximation of Eq. (1) derived from the Maclaurin expansion of the cosine function (see Patent Literature 2 (Unexamined Japanese Patent Application Kokai Publication No. 2012-129259)). For this reason, in the case in which the propagation angle $\theta$ of light equals $\theta_k$ indicated by Eq. (4), the propagation angle $\theta$ substantially equals $\theta_k$ indicated by Eq. (1).

Additionally, the shape, material, placement and dimensions of each structural element constituting the wavelength monitor 10 may be arbitrary modified to constitute the wavelength monitor 10. For example, the number of light sources may be less than 12 or more than 12. Also, the focal length of the lens 22 may be a value other than 0.7 mm. Also, the shape of the light-sensing faces F41 to F46 is not limited to square or rectangular, and may also be circular or the like. In addition, the number of detector elements according to Embodiment 7 is not limited to four, and may be suitably modified according to the magnitude of the propagation angle $\theta$.

Also, the FSR of the transmitting characteristics, the index of refraction, the temperature characteristics, and the coefficient of linear expansion of the filter 30 may be values different from those according to Embodiment 8. In Embodiment 8, the first temperature T1 is 25.0° C. and the second temperature T2 is 68.2° C., but the first temperature T1 and the second temperature T2 are not limited to these values. It is sufficient to determine the values of the first temperature T1 and the second temperature T2 such that the peak frequency of the transmitting characteristics becomes greater than $v_k$ by $F_k$ for all light sources L1 to L12.

Additionally, the LD temperature adjuster 23 and the filter temperature adjuster 60 are not limited to Peltier elements. For example, in the case in which the temperature of the filter 30 and the temperature of the light sources L1 to L12 are set at or above the temperature of the room in which the optical module is installed, heaters may be used as the LD temperature adjuster 23 and the filter temperature adjuster 60.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A wavelength monitor comprising:
a filter whose transmittance periodically varies with respect to incident light frequency;
an incidence guide that, provided that $v_k$ is a frequency acting as a reference for monitoring wavelength of light from a kth light source from among a plurality of sequentially arranged light sources, provided that $F_k$ is a positive value according to the kth light source, provided that $f_k$ is a sum obtained by adding $F_k$ to $v_k$ or a difference obtained by subtracting $F_k$ from $v_k$, provided that $m_k$ is the order of interference according to the kth light source, provided that c is the speed of light, provided that n is the refractive index of the filter, and provided that L is the length of the filter, causes light from the plurality of light sources to be incident on the filter such that, when light from the kth light source propagates through the interior of the filter, a propagation angle of that light equals $\theta_k$ obtained by computation using $m_k$, c, n, L, and $f_k$; and
a detector that senses transmitted light transmitted through the filter, and detects the intensity of transmitted light;
wherein the incidence guide causes light to be incident on the filter, taking $f_k$ to be the sum of $v_k$ and $F_k$ for at least one of the light sources, and taking $f_k$ to be the difference between $v_k$ and $F_k$ for at least one other of the light sources.

2. The wavelength monitor according to claim 1, wherein the incidence guide causes light to be incident on the filter such that the propagation angle of light from the kth light source equals $\theta_k$ expressed by the following Eq. (1):

$$\theta_k = \arccos\left(\frac{m_k c}{2nLf_k}\right). \tag{1}$$

3. The wavelength monitor according to claim 1, wherein the incidence guide causes light to be incident on the filter, taking $F_k$ to be a difference between a first frequency of light when the transmittance of the filter with respect to light from the kth light source is less than a transmittance corresponding to peaks in transmitting characteristics indicating a relationship between transmittance and frequency, but greater than a transmittance corresponding to bottoms in the transmitting characteristics, and a second frequency closest to the first frequency from among frequencies corresponding to peaks in the transmitting characteristics, the first frequency having a value based on a slope of the transmitting characteristics of the filter.

4. The wavelength monitor according to claim 1, wherein the incidence guide causes light to be incident on the filter, taking $F_k$ to be a value such that, when light from each of the plurality of light sources is transmitted through the filter, the intensities of transmitted light at frequency $v_k$ detected by the detector all equal a reference value.

5. The wavelength monitor according to claim 1, wherein the incidence guide causes light to be incident on the filter, taking $F_k$ to be a value less than a half cycle of the transmitting characteristics of the filter.

6. The wavelength monitor according to claim 1, wherein the incidence guide, provided that K is the number of the light sources, provided that $f_k$ is the sum of $v_k$ and $F_k$ when the value of the following Eq. (2) is an even number, and provided that $f_k$ is the difference between $v_k$ and $F_k$ when the value of the following Eq. (2) is an odd number, causes light to be incident on the filter such that the propagation angle of light from the kth light source is greater than the propagation angle of light from the (k−1)th light source:

$$\left\lceil \left| k - \left( \frac{K}{2} + 0.5 \right) \right| \right\rceil. \quad (2)$$

7. The wavelength monitor according to claim 1, wherein the incidence guide, provided that K is the number of the light sources, provided that $f_k$ is the sum of $v_k$ and $F_k$ when the value of the following Eq. (3) is an odd number, and provided that $f_k$ is the difference between $v_k$ and $F_k$ when the value of the following Eq. (3) is an even number, causes light to be incident on the filter such that the propagation angle of light from the kth light source is greater than the propagation angle of light from the (k−1)th light source:

$$\left\lceil \left| k - \left( \frac{K}{2} + 0.5 \right) \right| \right\rceil. \quad (3)$$

8. The wavelength monitor according to claim 1, wherein the incidence guide includes
   a plurality of semiconductor lasers as the plurality of light sources, and
   a lens that collimates light from the plurality of semiconductor lasers, and
   an emission point of light emitted from the kth semiconductor laser is disposed such that the propagation angle of light that propagates through the interior of the filter equals $\theta_k$ obtained by computation using $m_k$, c, n, L, and $f_k$.

9. The wavelength monitor according to claim 1, wherein the incidence guide includes
   a plurality of semiconductor lasers as the plurality of light sources,
   an optical waveguide that guides light from the plurality of semiconductor lasers and emits light from the kth semiconductor laser from emission points disposed such that the propagation angle of light that propagates through the interior of the filter equals $\theta_k$ obtained by computation using $m_k$, c, n, L, and $f_k$, and
   a lens that collimates light emitted from the emission points.

10. The wavelength monitor according to claim 9, wherein the optical waveguide is formed on a semiconductor substrate, and
    an angle obtained between a direction in which light from at least one of the semiconductor lasers is guided by the optical waveguide and an edge face of the semiconductor substrate is 85 degrees or less.

11. The wavelength monitor according to claim 1, wherein the incidence guide includes
    as the plurality of light sources, a plurality of semiconductor lasers that emit light from emission points disposed in parallel with equal spacing, and
    a lens that collimates light emitted from the emission points, and
    the shape of the lens is formed such that the propagation angle of light when light from the kth semiconductor laser propagates through the interior of the filter equals $\theta_k$ obtained by computation using $m_k$, c, n, L, and $f_k$.

12. The wavelength monitor according to claim 8, wherein each of the semiconductor lasers is separated from the other neighboring semiconductor lasers by a distance equal to or greater than a threshold.

13. The wavelength monitor according to claim 1, wherein the filter includes a first reflecting face and a second reflecting face that oppose each other,
    the propagation angle of light that propagates through the interior of the filter is at least any one of a refractive angle of light that propagated into the interior of the filter, an angle of incidence of light incident on the first reflecting face or the second reflecting face, and an angle of reflection of light reflecting off the first reflecting face or the second reflecting face,
    the refractive index of the filter is the refractive index between the first reflecting face and the second reflecting face, and
    the length of the filter is the distance between the first reflecting face and the second reflecting face.

14. The wavelength monitor according to claim 13, wherein
    the propagation angle of light that propagates through the interior of the filter is an angle with reference to a direction perpendicular to the first reflecting face or the second reflecting face,
    the plurality of light sources includes a first light source and a second light source that differs from the first light source,
    the propagation angle of light from the first light source is a positive value, and
    the propagation angle of light from the second light source is a negative value.

15. The wavelength monitor according to claim 1, wherein the magnitude of the propagation angle of light from each of the plurality of light sources is equal to or greater than 0.7 degrees in all cases.

16. The wavelength monitor according to claim 1, wherein the plurality of light sources are disposed in parallel in a single direction, and
    the detector senses transmitted light at a rectangular light-sensing face whose longer direction is a direction parallel to the direction in which the plurality of light sources are disposed.

17. The wavelength monitor according to claim 1, wherein the plurality of light sources are disposed in parallel in a single direction, and
    the detector senses transmitted light at a plurality of light-sensing faces disposed in a direction parallel to the direction in which the plurality of light sources are disposed.

18. The wavelength monitor according to claim 1, comprising:
    a temperature adjuster that adjusts the temperature of the filter;
    wherein, in the case in which the temperature of the filter is a first temperature, the incidence guide, provided that $f_k$ is the sum of $v_k$ and $F_k$ for at least one of the light sources, and provided that $f_k$ is the difference between $v_k$ and $F_k$ for at least one other of the light sources, causes light from the plurality of light sources to be incident on the filter such that the propagation angle of light when light from the kth light source propagates through the interior of the filter equals $\theta_k$ obtained by computation using $m_k$, c, n, L, and $f_k$, and
    the temperature adjuster adjusts the temperature of the filter to a second temperature different from the first temperature in the case in which light is emitted from the kth light source corresponding to an $f_k$ that is the difference between $v_k$ and $F_k$ when the temperature of the filter is the first temperature.

19. The wavelength monitor according to claim 18, wherein in the case in the temperature of the filter is set to the second temperature by the temperature adjuster, the incidence guide causes light from the kth light source corresponding to an $f_k$ that is the difference between $v_k$ and $F_k$ when the temperature of the filter is the first temperature to be incident on the filter such that the propagation angle of light when light propagates through the interior of the filter equals $\theta_k$ obtained by computation using $m_k$, c, n, L, and $f_k$, provided that $f_k$ is the sum of $v_k$ and $F_k$.

20. A wavelength monitoring method comprising:

a filtering step that filters light using a filter whose transmittance periodically varies with respect to incident light frequency;

an incidence guiding step that, provided that $v_k$ is a frequency acting as a reference for monitoring wavelength of light from the kth light source from among a plurality of sequentially arranged light sources, provided that $F_k$ is a positive value according to the kth light source, provided that $f_k$ is a sum obtained by adding $F_k$ to $v_k$ or a difference obtained by subtracting $F_k$ from $v_k$, provided that $m_k$ is the order of interference according to the kth light source, provided that c is the speed of light, provided that n is the refractive index of the filter, and provided that L is the length of the filter, causes light from the plurality of light sources to be incident on the filter such that, when light from the kth light source propagates through the filter interior, a propagation angle of that light becomes equal to $\theta_k$ obtained by computation using $m_k$, c, n, L, and $f_k$; and a detecting step that senses transmitted light transmitted through the filter, and detects the intensity of transmitted light;

wherein, in the incidence guiding step, light is made to be incident on the filter, taking $f_k$ to be the sum of $v_k$ and $F_k$ for at least one of the light sources, and taking $f_k$ to be the difference between $v_k$ and $F_k$ for at least one other of the light sources.

* * * * *